US012578892B2

(12) United States Patent
Mayo et al.

(10) Patent No.: US 12,578,892 B2
(45) Date of Patent: Mar. 17, 2026

(54) FINGERPRINT TRACKING STRUCTURE FOR STORAGE SYSTEM

(71) Applicant: HEWLETT PACKARD ENTERPRISE DEVELOPMENT LP, Houston, TX (US)

(72) Inventors: Richard Phillip Mayo, Bristol (GB); Andrew Skinner, Bristol (GB); Joshua Peck, Wales (GB)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/050,626

(22) Filed: Oct. 28, 2022

(65) Prior Publication Data

US 2024/0143213 A1     May 2, 2024

(51) Int. Cl.
  *G06F 15/16* (2006.01)
  *G06F 3/06* (2006.01)
(52) U.S. Cl.
  CPC .......... *G06F 3/0641* (2013.01); *G06F 3/0656* (2013.01); *G06F 3/0604* (2013.01); *G06F 3/0679* (2013.01)
(58) Field of Classification Search
  None
  See application file for complete search history.

(56) References Cited

U.S. PATENT DOCUMENTS 5,467,131 A * 11/1995 Bhaskaran ............ G06F 17/147
                                              375/E7.231
8,799,238 B2   8/2014 Eshghi et al.

| | | | |
|---|---|---|---|
| 9,292,530 B2 | 3/2016 | Nag Yasa et al. | |
| 9,563,683 B2 | 2/2017 | Abercrombie et al. | |
| 9,798,728 B2 | 10/2017 | Zheng | |
| 9,928,266 B2 | 3/2018 | Dean et al. | |
| 9,934,237 B1 * | 4/2018 | Shilane ................ G06F 16/178 | |
| 10,365,974 B2 | 7/2019 | Todd et al. | |
| 11,182,256 B2 | 11/2021 | Mayo et al. | |
| 2015/0193487 A1 * | 7/2015 | Demidov ............ G06F 16/2272 | |
| | | | 707/756 |

(Continued)

OTHER PUBLICATIONS

Walker. B Tree in Data Structure: Search, Insert, Delete Operation Example. Aug. 2022, pp. 1-16. https://www.guru99.com/b-tree-example.html. (Year: 2022).*

(Continued)

*Primary Examiner* — Alex Gofman
*Assistant Examiner* — Shelly X Qian
(74) *Attorney, Agent, or Firm* — Trop, Pruner & Hu, P.C.

(57) ABSTRACT

Example implementations relate to deduplication operations in a storage system. An example includes receiving data units to be stored in a persistent storage of a deduplication storage system; generating a fingerprint for each received data unit; identifying a set of fingerprints to be stored in container indexes, the container indexes including metadata indicating storage locations of data units stored in the persistent storage of the deduplication storage system; storing the identified set of fingerprints in at least one container index; and loading fingerprint entries for the identified set of fingerprints in a root node of a fingerprint tracking structure, where the fingerprint tracking structure is to identify each data unit stored in the persistent storage of the deduplication storage system.

20 Claims, 17 Drawing Sheets

(56) References Cited

U.S. PATENT DOCUMENTS

| | | | |
|---|---|---|---|
| 2016/0026652 A1* | 1/2016 | Zheng | G06F 16/137 |
| | | | 707/692 |
| 2022/0107925 A1* | 4/2022 | Goswami | G06F 16/215 |

OTHER PUBLICATIONS

Layton. Extended File Attributes. 2022, pp. 1-6. https://www.admin-magazine.com/HPC/Articles/Extended-File-Attributes. (Year: 2022).*

Malith, "Can we put hash tables inside a hash table?", available online at <https://stackoverflow.com/questions/28362502/can-we-put-hash-tables-inside-a-hash-table>, StackOverflow, Feb. 2015, 3 pages.

Nakamura et al., "Content-defined Merkle Trees for Efficient Container Delivery", Apr. 5, 2021, 10 pages.

Wikipedia, "Bloom filter", available online at <https://en.wikipedia.org/w/index.php?title=Bloom_filter&oldid=1104716059>, Aug. 16, 2022, 24 pages.

* cited by examiner

Tracking Node
Tree  300

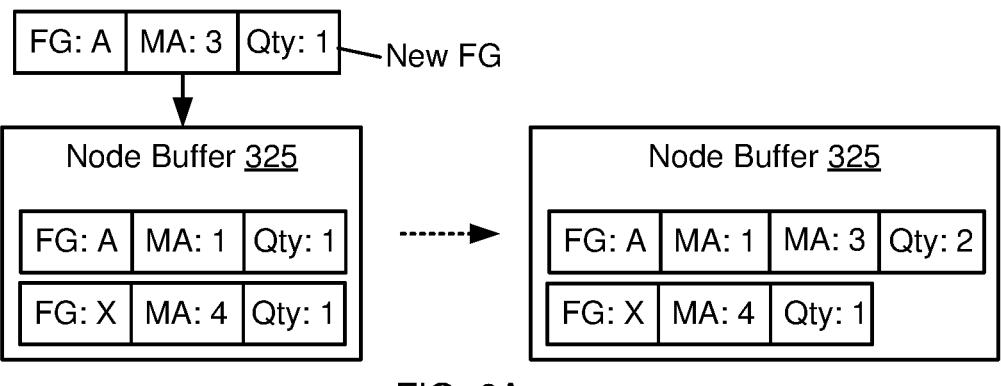
FIG. 6A
FIG. 6B
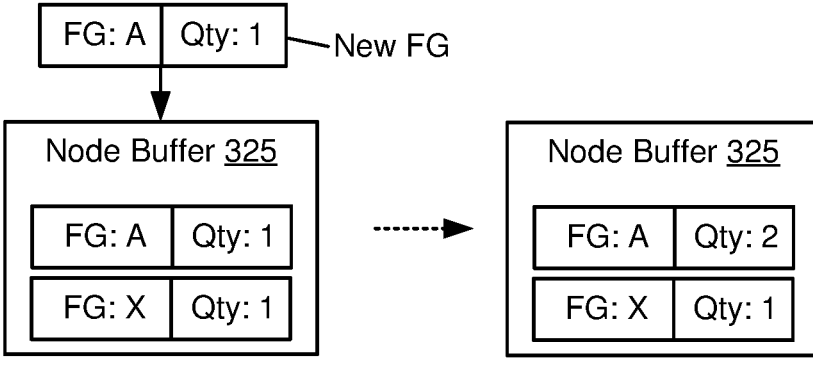
FIG. 6C

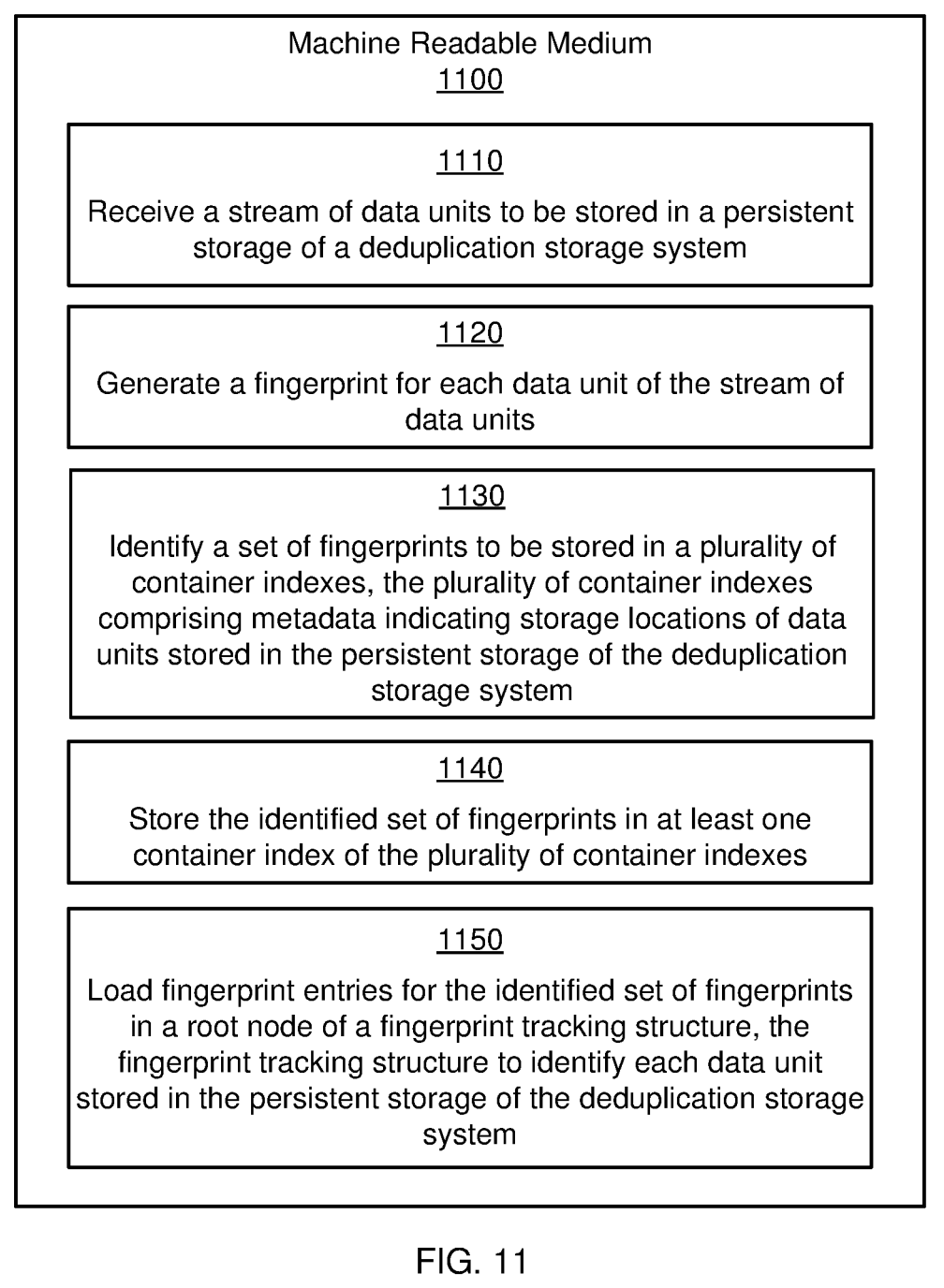

Machine Readable Medium
1100

1110

Receive a stream of data units to be stored in a persistent storage of a deduplication storage system

1120

Generate a fingerprint for each data unit of the stream of data units

1130

Identify a set of fingerprints to be stored in a plurality of container indexes, the plurality of container indexes comprising metadata indicating storage locations of data units stored in the persistent storage of the deduplication storage system

1140

Store the identified set of fingerprints in at least one container index of the plurality of container indexes

1150

Load fingerprint entries for the identified set of fingerprints in a root node of a fingerprint tracking structure, the fingerprint tracking structure to identify each data unit stored in the persistent storage of the deduplication storage system

FIG. 11

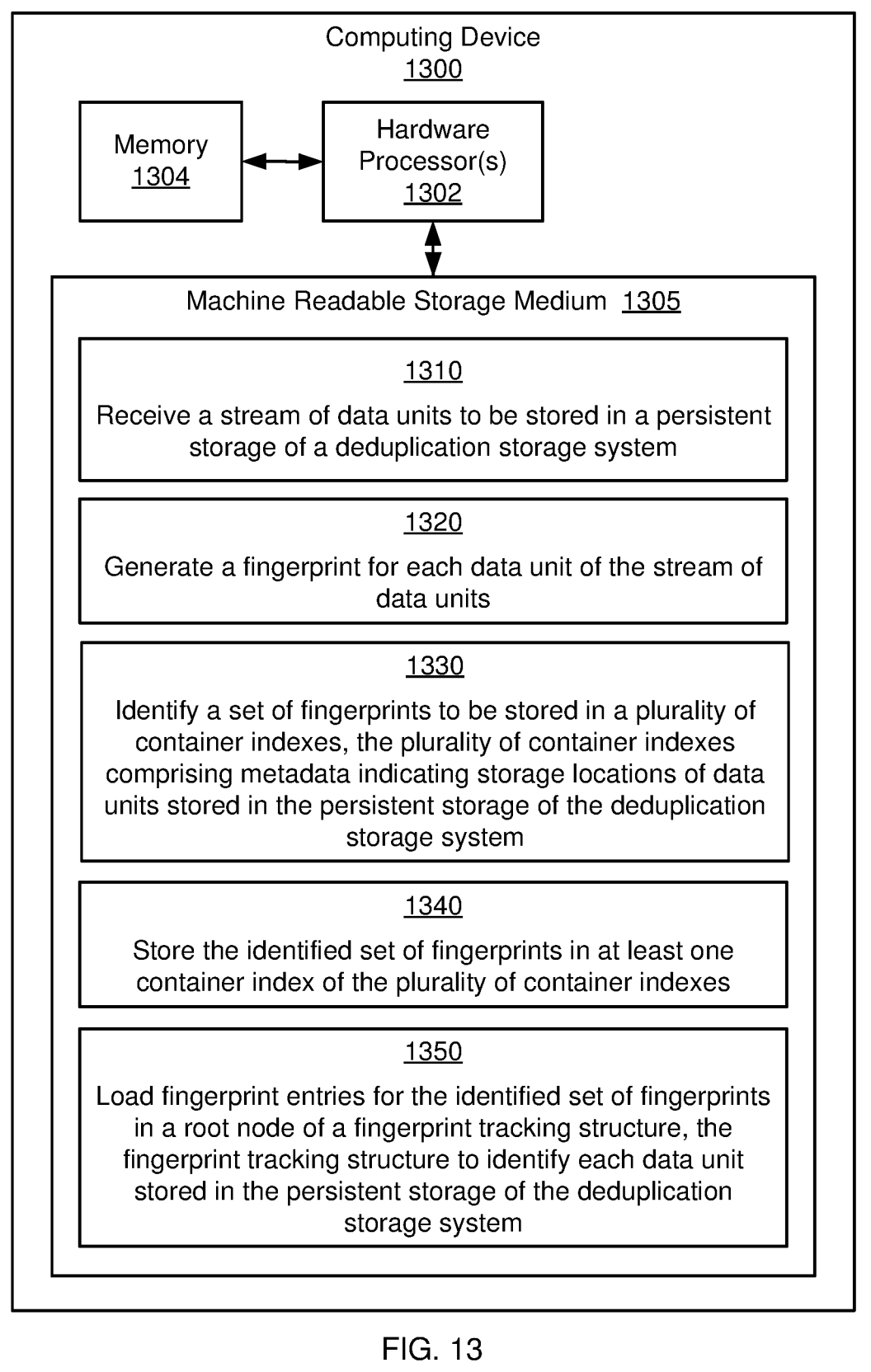

Computing Device
1300

Memory
1304

Hardware
Processor(s)
1302

Machine Readable Storage Medium  1305

1310

Receive a stream of data units to be stored in a persistent storage of a deduplication storage system

1320

Generate a fingerprint for each data unit of the stream of data units

1330

Identify a set of fingerprints to be stored in a plurality of container indexes, the plurality of container indexes comprising metadata indicating storage locations of data units stored in the persistent storage of the deduplication storage system

1340

Store the identified set of fingerprints in at least one container index of the plurality of container indexes

1350

Load fingerprint entries for the identified set of fingerprints in a root node of a fingerprint tracking structure, the fingerprint tracking structure to identify each data unit stored in the persistent storage of the deduplication storage system

FIG. 13

FINGERPRINT TRACKING STRUCTURE FOR STORAGE SYSTEM

BACKGROUND

Data reduction techniques can be applied to reduce the amount of data stored in a storage system. An example data reduction technique includes data deduplication. Data deduplication identifies data units that are duplicative, and seeks to reduce or eliminate the number of instances of duplicative data units that are stored in the storage system.

BRIEF DESCRIPTION OF THE DRAWINGS

Some implementations are described with respect to the following figures.

FIGS. 6A-6E are illustrations of example operations, in accordance with some implementations.

FIG. 11 is a diagram of an example machine-readable medium storing instructions in accordance with some implementations.

FIG. 13 is a schematic diagram of an example computing device, in accordance with some implementations.

Figure 1:
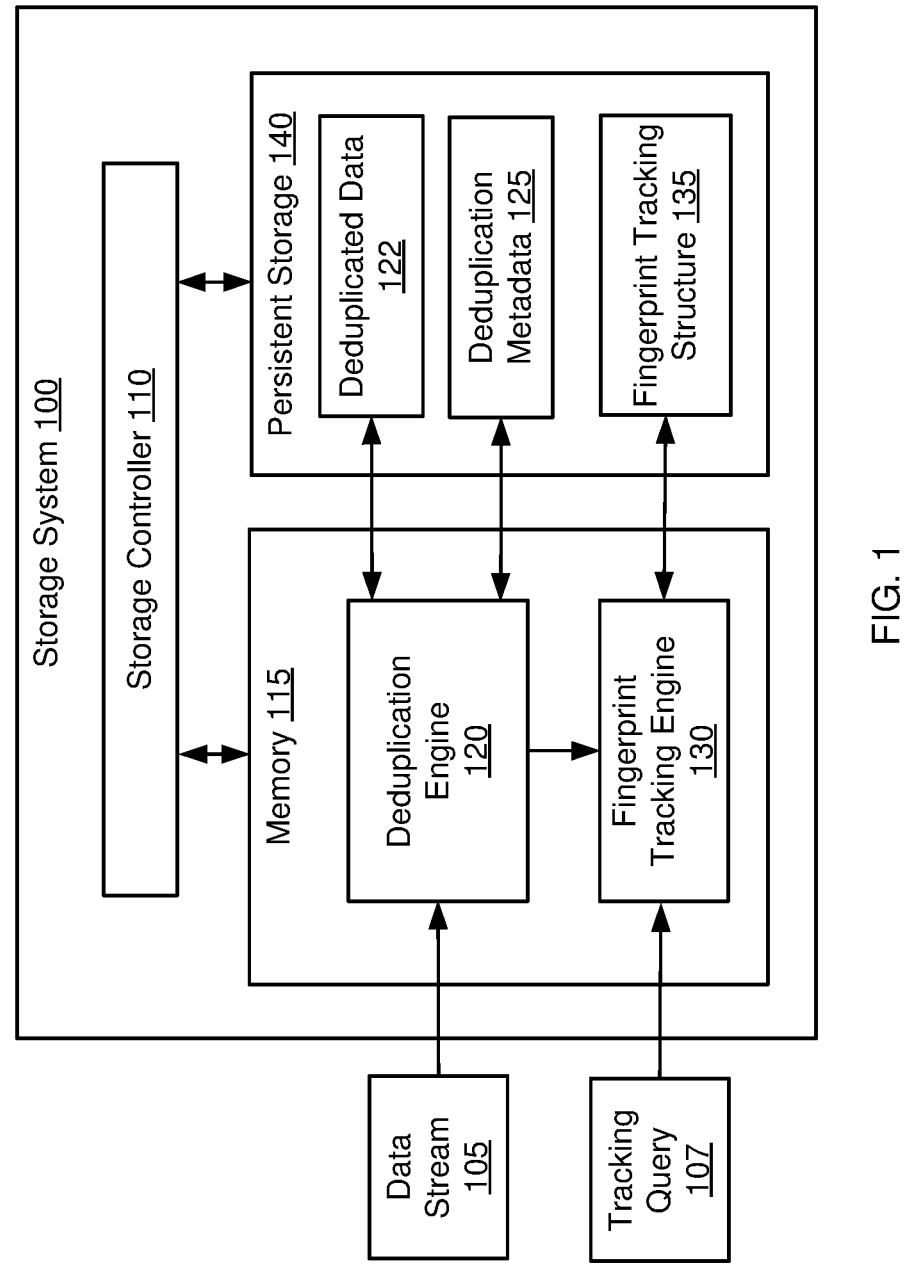
FIG. 1 is a schematic diagram of an example storage system, in accordance with some implementations.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, a storage system may back up a collection of data (referred to herein as a "stream" of data or a "data stream") in deduplicated form, thereby reducing the amount of storage space required to store the data stream. The storage system may create a "backup item" to represent a data stream in a deduplicated form. The storage system may perform a deduplication process including breaking a stream of data into discrete data units (or "chunks") and determining "fingerprints" (described below) for these incoming data units. Further, the storage system may compare the fingerprints of incoming data units to fingerprints of stored data units, and may thereby determine which incoming data units are duplicates of previously stored data units (e.g., when the comparison indicates matching fingerprints). In the case of data units that are duplicates, the storage system may store references to previously stored data units instead of storing the duplicate incoming data units.

As used herein, the term "fingerprint" refers to a value derived by applying a function on the content of the data unit (where the "content" can include the entirety or a subset of the content of the data unit). An example of a function that can be applied includes a hash function that produces a hash value based on the content of an incoming data unit. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

A "storage system" can include a storage device or an array of storage devices. A storage system may also include storage controller(s) that manage(s) access of the storage device(s). A "data unit" can refer to any portion of data that can be separately identified in the storage system. In some cases, a data unit can refer to a chunk, a collection of chunks, or any other portion of data. In some examples, a storage system may store data units in persistent storage. Persistent storage can be implemented using one or more of persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

In some examples, a deduplication storage system may use metadata for processing inbound data streams. For example, such metadata may include data recipes (also referred to herein as "manifests") that specify the order in which particular data units are received (e.g., in a data stream). The processing of each data stream may be referred to herein as a "backup process." Subsequently, in response to a read request, the deduplication system may use a set of manifests (also referred to herein as "item metadata") to determine the received order of data units, and may thereby recreate the original data stream. Accordingly, the set of manifests may be a representation of the original data stream. The manifests may include a sequence of records, with each record representing a particular set of data unit(s). The records of the manifest may include one or more fields that identify container indexes that include storage information for the data units. For example, a container index may include one or more fields that specify location information (e.g., containers, offsets, etc.) for the stored data units, compression and/or encryption characteristics of the stored data units, and so forth. The container index may include reference counts that indicate the number of manifests that reference each data unit.

In some examples, upon receiving a data unit (e.g., in a data stream), it may be matched against one or more container indexes to determine whether an identical chunk is already stored in a container of the deduplication storage system. For example, the deduplication storage system may compare the fingerprint of the received data unit against the fingerprints in one or more container indexes. If no matching fingerprints are found in the searched container index(es), the received data unit may be added to a container, and an entry for the received data unit may be added to a container index corresponding to that container. However, if a matching fingerprint is found in a searched container index, it may be determined that a data unit identical to the received data unit is already stored in a container. In response to this determination, the reference count of the corresponding entry is incremented, and the received data unit is not stored in a container (as it is already present in one of the containers), thereby avoiding storing a duplicate data unit in the deduplication storage system. As used herein, the term "matching operation" may refer to an operation to compare fingerprints of a collection of multiple data units (e.g., from a particular backup data stream) against fingerprints stored in a container index.

In some examples, the deduplication storage system may receive requests for information about the quantity and/or location of data units (if any) with specific fingerprints (also referred to herein as "tracking information" of data units). For example, the deduplication storage system may receive a tracking query to determine whether any data unit(s) with a particular fingerprint are stored in deduplicated form, and if so, the number and/or location of those stored data units. However, it may be impractical to attempt to search all of the container indexes of the deduplication storage system to identify each instance of a particular fingerprint, and then determine the location(s) of the corresponding data unit(s). For example, some deduplication storage systems may not allow the exhaustive search of all container indexes for fingerprints of received data units (e.g., the search is limited to a specified number of container indexes). Therefore, if no match is found for a particular fingerprint during the search, that fingerprint may be added to a new container index. However, the same fingerprint may also be stored in another container index that was not searched (e.g., due to the search limit). Accordingly, identifying the number and/or location of each data unit with the specified fingerprint may require exhaustively searching all container indexes of the deduplication storage system, and may thus consume excessive amounts of processing time, system bandwidth, memory space, and so forth.

In accordance with some implementations of the present disclosure, a storage system may include deduplication metadata and a fingerprint tracking structure. The deduplication metadata may include container indexes to store fingerprints and pointers for stored data units. The fingerprint tracking structure may be a node tree to store entries including fingerprints and tracking information (e.g., quantity and/or location) for stored data units. In some implementations, the storage system may use the deduplication metadata to determine whether received data units are duplicates of previously stored data units (e.g., by matching fingerprints of received data units against fingerprints stored in container indexes). Upon identifying a set of new data units (i.e., data units with fingerprints that did not match the stored fingerprints in container indexes), the storage system may store the new data units in data containers, and may store the fingerprints and locations of the new data units in container index(es). Further, in some implementations, the fingerprints (and tracking information) of the new data units may be included in data objects (referred to herein as "fingerprint entries") that are loaded in a root node of the fingerprint tracking structure.

In some implementations, when the root node of the fingerprint tracking structure is full (e.g., reaches a maximum number of stored fingerprint entries), the stored fingerprint entries may be removed from the root node, and may be distributed among a set of child nodes (also referred to herein as "flushing" the stored fingerprint entries). This flushing process may be continued for multiple levels of nodes. In some implementations, for each level of nodes, the distribution of fingerprint entries among child nodes may be based on a level-shifted bitmask applied to the fingerprints. For example, for a first level including four nodes, the fingerprint entries may be distributed to the four nodes based on the four different combinations of the first and second bits of the fingerprints (e.g., 00, 01, 10, and 11). Further, for a second level including four nodes, the fingerprint entries may be distributed to the four nodes based on the four different combinations of the third and fourth bits of the fingerprints. This process may continue for additional levels that use successive pairs of bits from the fingerprint, with the last layer using the last pair of bits of the fingerprint. In this manner, each fingerprint entry may be routed into a single path through the fingerprint tracking structure, where each path includes one node per level of the fingerprint tracking structure. Further, when the fingerprint tracking structure includes multiple fingerprint entries with the same fingerprint (e.g., when the same data unit is received multiple times), all of these fingerprint entries will be stored and flushed along the same path. In some implementations, if two fingerprint entries for the same fingerprint are stored in the same node, these duplicate fingerprint entries may be merged into a single fingerprint entry.

In some implementations, upon receiving a tracking query for a particular fingerprint, the storage system may traverse the corresponding path in the fingerprint tracking structure (i.e., the single node path for that fingerprint), and may collect tracking information from the fingerprint entries for that fingerprint that are stored in the traversed path. The collected tracking information (e.g., quantity and/or location of data units with the fingerprint) may be provided as a response to the tracking query. Therefore, the storage system may process the tracking query by traversing a predefined and relatively small number of nodes (i.e., one node per tree level), and without having to exhaustively load and process a large amount of deduplication metadata (e.g., container indexes). In this manner, use of the fingerprint tracking structure may provide a relatively rapid and efficient processing of tracking queries, and may thereby improve the performance of the deduplication storage system. The disclosed technique using the fingerprint tracking structure is discussed further below with reference to FIGS. 1-13.

FIG. 1—Example Storage System

FIG. 1 shows an example of a storage system 100 that includes a storage controller 110, memory 115, and persistent storage 140, in accordance with some implementations. The persistent storage 140 may include one or more non-transitory storage media such as hard disk drives (HDDs), solid state drives (SSDs), optical disks, and so forth, or a combination thereof. The memory 115 may be implemented in semiconductor memory such as random access memory (RAM). In some examples, the storage controller 110 may be implemented via hardware (e.g., electronic circuitry) or a combination of hardware and programming (e.g., comprising at least one processor and instructions executable by the at least one processor and stored on at least one machine-readable storage medium).

As shown in FIG. 1, the memory 115 may include a deduplication engine 120 and a fingerprint tracking engine 130. As used herein, an "engine" may refer to machine-readable instructions (e.g., software instructions and/or firmware instructions stored on at least one machine-readable storage medium) executable on a hardware processing circuit. For example, the deduplication engine 120 and a fingerprint tracking engine 130 may be implemented as program code that is executed by the storage controller 110 and loaded in memory 115. Further, in some implementations, the program code for engines 120, 130 may be stored in the persistent storage 130. Alternatively, an "engine" may refer to a hardware processing circuit (e.g., any or some combination of a microprocessor, a core of a multi-core microprocessor, a microcontroller, a programmable integrated circuit, a programmable gate array, a digital signal processor, or another hardware processing circuit), or a combination of a hardware processing circuit and machine-readable instructions.

In some implementations, the deduplication engine 120 may perform deduplication of stored data. For example, the deduplication engine 120 may receive an inbound data stream 105 including multiple data units, and may store at least one copy of each data unit as stored data 122 in deduplicated form. Further, the deduplication engine 120 may use stored deduplication metadata 125 for processing and reconstructing the original data stream 125 from the stored data 122.

In some implementations, the deduplication engine 120 may generate a fingerprint for each data unit. For example, the fingerprint may include a full or partial hash value based on the data unit. To determine whether an incoming data unit is a duplicate of a stored data unit, the deduplication engine 120 may compare the fingerprint generated for the incoming data unit to fingerprints stored in the deduplication metadata 125 (e.g., in a container index). The inbound data units with fingerprints that match the stored fingerprints (in deduplication metadata 125) are determined to be copies of previous data units that are already included in stored data 122, and the deduplication engine 120 then stores references to the previous data units in stored data 122 (instead of storing the duplicate incoming data units). Further, the remaining inbound data units with fingerprints that do not match the stored fingerprints are determined to be new data units (i.e., that are not be included in stored data 122). The deduplication engine 120 then adds the new data units to the stored data 122, and updates the deduplication metadata 125 to record information about the new data units.

In some implementations, the deduplication metadata 125 may include manifests to record the order in which the data units were received. Each manifest may include a pointer or other information indicating a container index that is associated with each data unit. The associated container index may indicate the location in which the data unit is stored (e.g., offset, entity, data container, etc.). The container index may include reference counts that indicate the number of manifests that reference each data unit. Example implementations of such deduplication metadata 125 are discussed below with reference to FIG. 2.

In some implementations, when the deduplication engine 120 identifies new data units in the data stream 105 (i.e., inbound data units with fingerprints that do not match the stored fingerprints in deduplication metadata 125), the deduplication engine 120 may provide the fingerprints (and associated information) for the new data units to the fingerprint tracking engine 130. In some implementations, the fingerprint tracking engine 130 may load fingerprint entries (for the fingerprints of the new data units) into the fingerprint tracking structure 135. Subsequently, the fingerprint tracking engine 130 may receive a tracking query 107 requesting tracking information about a particular fingerprint, and may then use the fingerprint tracking structure 135 to search for the requested information. If the requested information is found in the fingerprint tracking structure 135, the fingerprint tracking engine 130 may provide the requested information in a response to the tracking query 107 (e.g., provided to a user, an application, and so forth).

In some implementations, the fingerprint tracking structure 135 may be implemented as a node tree that stores fingerprint entries in nodes. Further, each fingerprint entry may be propagated through a single node path through the node tree, and each node path may include a predefined and relatively small number of nodes. As such, the fingerprint tracking engine 130 may obtain the requested information (if available) for a fingerprint by traversing the single node path in the fingerprint tracking structure 135 that corresponds to that fingerprint, and collecting tracking information from any stored fingerprint entries for that fingerprint that are found in the traversed nodes. In this manner, the fingerprint tracking structure 135 may be used to provide a relatively rapid and efficient processing of the tracking query 107, and may thereby improve the performance of the storage system 100. Example implementations of the fingerprint tracking structure 135 are discussed further below with reference to FIGS. 3A-13.

It is noted that FIG. 1 illustrates an example implementation in which the storage system 100 uses both the fingerprint tracking structure 135 and the deduplication metadata 125, but the fingerprint tracking structure 135 is not used for deduplication of the stored data 122. However, other implementations are possible. For example, in other implementations, the fingerprint tracking structure 135 may be used to deduplicate the stored data 122, instead of using separate deduplication metadata 125 (e.g., container indexes). An example implementation using a fingerprint tracking structure 135 for deduplication is discussed below with reference to FIG. 5.

Figure 2:
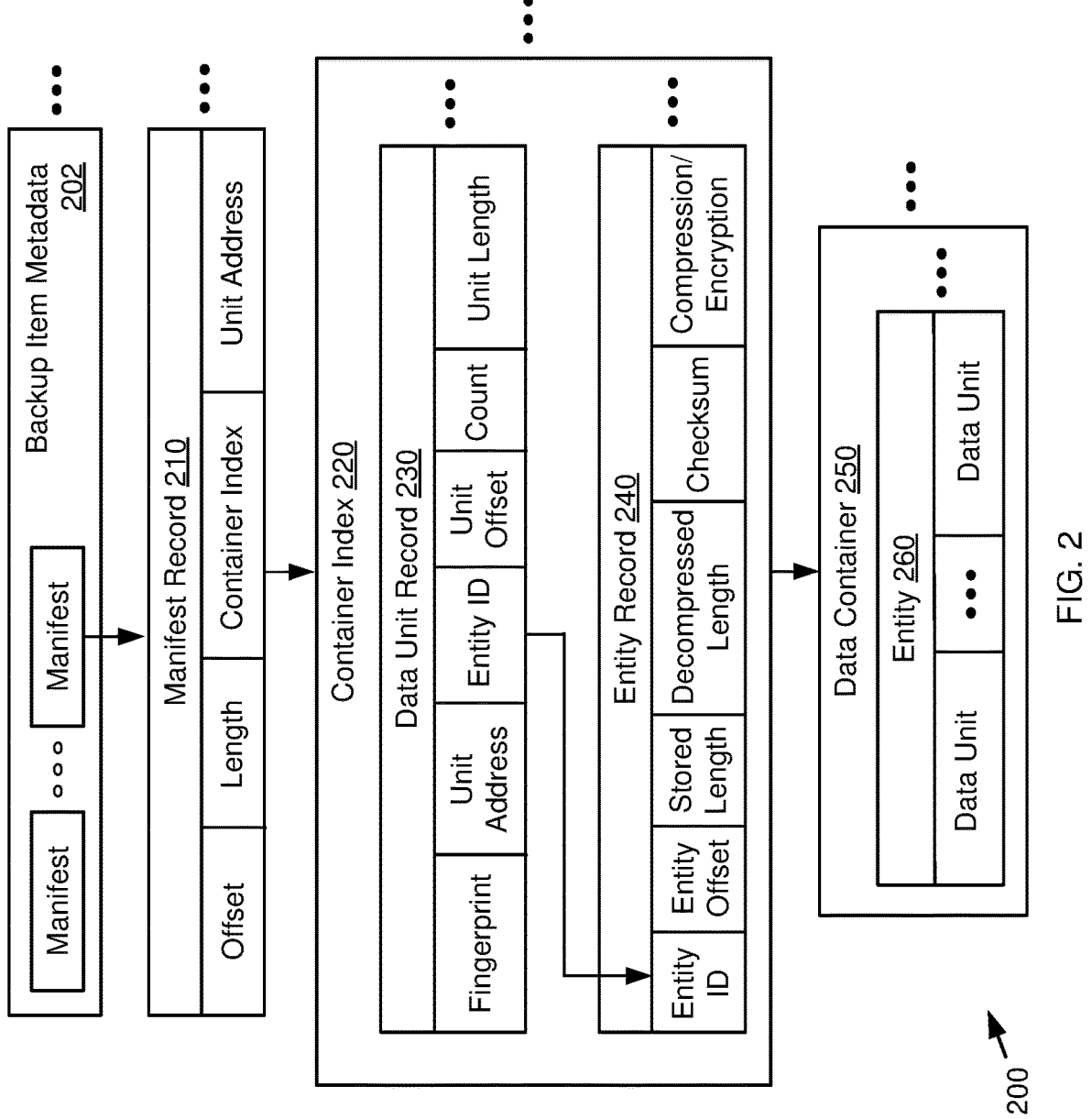
FIG. 2 is an illustration of example data structures, in accordance with some implementations.

FIG. 2—Example Data Structures

Referring now to FIG. 2, shown is an illustration of example data structures 200 used in deduplication, in accordance with some implementations. As shown, the data structures 200 may include backup item metadata 202, a manifest record 210, a container index 220, and a data container 250. In some implementations, the backup item metadata 202 may include multiple manifest records 210. In some examples, the example data structures 200 may correspond generally to example implementations of the deduplication metadata 125 (shown in FIG. 1). In some examples, the data structures 200 may be generated and/or managed by the storage controller 110 (shown in FIG. 1).

Although one of each is shown for simplicity of illustration in FIG. 2, data structures 200 may include a plurality of instances of backup item metadata 202, each including or pointing to one or more manifest records 210. In such examples, data structures 200 may include a plurality of manifest records 210. The manifest records 210 may reference a plurality of container indexes 220, each corresponding to one of a plurality of containers 250. Each container index 220 may comprise one or a plurality of data unit records 230, and one or a plurality of entity records 240.

As shown in FIG. 2, in some examples, the manifest record 210 may include various fields, such as offset, length, container index, and unit address. In some implementations, each container index 220 may include any number of data unit record(s) 230 and entity record(s) 240. Each data unit record 230 may include various fields, such as a fingerprint (e.g., a hash of the data unit), a unit address, an entity identifier, a unit offset (i.e., an offset of the data unit within the entity), a reference count value, and a unit length. In some examples, the reference count value may indicate the number of manifest records 210 that reference the data unit record 230. Further, each entity record 240 may include various fields, such as an entity identifier, an entity offset (i.e., an offset of the entity within the container), a stored length (i.e., a length of the data unit within the entity), a decompressed length, a checksum value, and compression/encryption information (e.g., type of compression, type of encryption, and so forth). In some implementations, each container 250 may include any number of entities 260, and each entity 260 may include any number of stored data units.

In one or more implementations, the data structures 200 may be used to retrieve stored deduplicated data. For example, a read request may specify an offset and length of data in a given file. These request parameters may be matched to the offset and length fields of a particular manifest record 210. The container index and unit address of the particular manifest record 210 may then be matched to a particular data unit record 230 included in a container index 220. Further, the entity identifier of the particular data unit record 230 may be matched to the entity identifier of a particular entity record 240. Furthermore, one or more other fields of the particular entity record 240 (e.g., the entity offset, the stored length, checksum, etc.) may be used to identify the container 250 and entity 260, and the data unit may then be read from the identified container 250 and entity 260.

Figure 3A:
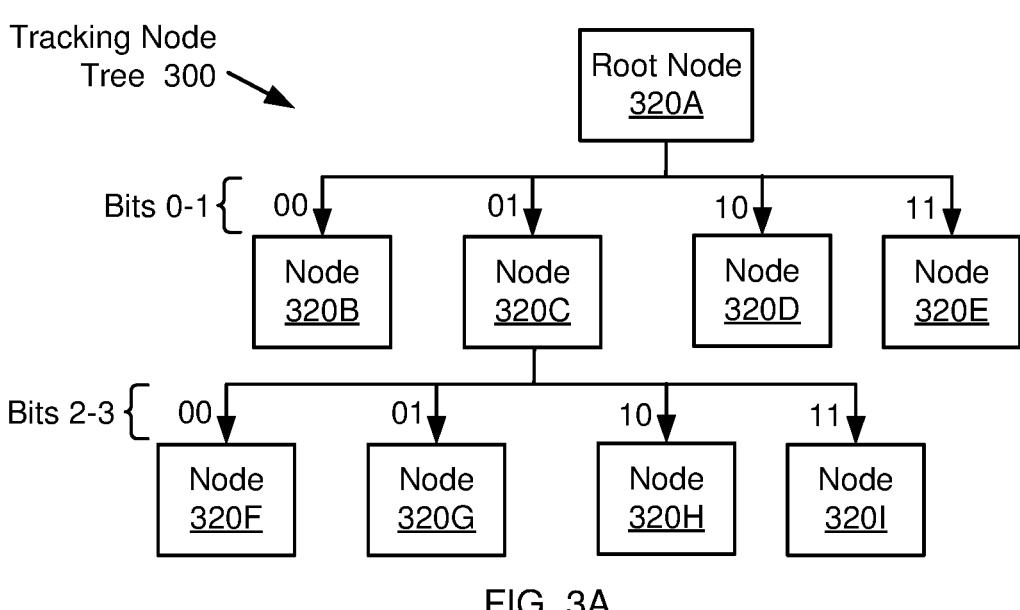
FIGS. 3A-3C are illustrations of example data structures, in accordance with some implementations.
Figure 3B:
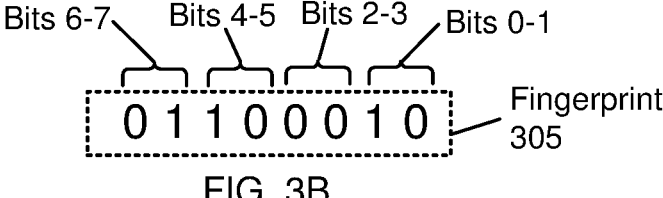
Figure 3C:
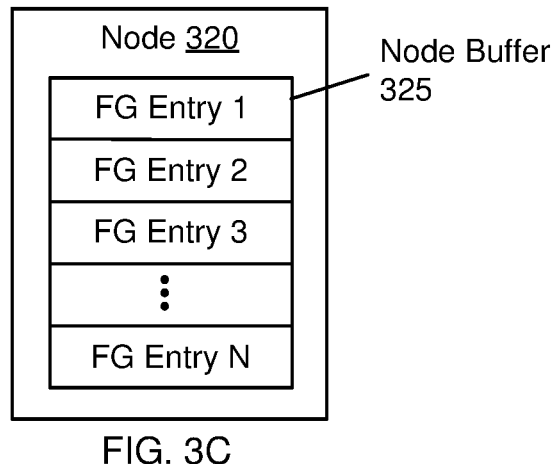

FIGS. 3A-3C—Example Data Structures

FIG. 3A shows an example tracking node tree 300, in accordance with some implementations. In some examples, the tracking node tree 300 may correspond generally to example implementation of the fingerprint tracking structure 135 (shown in FIG. 1).

As shown in FIG. 3A, the tracking node tree 300 may be a data structure including a number of nodes 320A-320I (also referred to herein as nodes 320). The nodes 320 may be organized in various levels that form parent-child relationships. For example, a first level may include a root node 320A, and a second level may include four nodes 320B-320E that are direct children of the root node 320A. Further, a third level may include nodes 320E-320I that are direct children of node 320C. In some implementations, the number of child nodes that are related to each parent node may be specified by a fan-out parameter associated with the tracking node tree 300. Note that, while not shown in FIG. 3A for the sake of clarity, any of the nodes 320B and 320D-320I could include a corresponding set of child nodes. Further, the tracking node tree 300 may include more levels of nodes than illustrated in FIG. 3A (e.g., a fourth level, a fifth level, and so forth).

Referring now to FIG. 3C, in some implementations, each node 320 may include a node buffer 325 to store a number of fingerprint entries ("FG Entry"). As used herein, the term "fingerprint entry" may refer to a data object that includes a single fingerprint for a new data unit, and which may include other data values or fields associated with the new data unit. For example, a fingerprint entry may include fields to store the fingerprint of the new data unit, the time that the new data unit was received, an identifier for a manifest including the new data unit, and so forth. Some example fingerprint entries are described below with reference to FIG. 5, in accordance with some implementations.

Referring again to FIG. 3A, all fingerprint entries may be initially loaded into the root node 320A. In some implementations, when the node buffer 325 of a node is filled to a maximum level or threshold, the fingerprint entries stored in that node buffer 325 may be distributed among the next downward level of nodes. For example, when the node buffer 325 of the root node 320A is filled, the fingerprint entries stored in the root node 320A may be distributed among nodes 320B-320E. Further, when the node buffer 325 of node 320C is filled, the fingerprint entries stored in node 320C may be distributed among nodes 320E-320I. In this manner, the fingerprint entries may be propagated downward through the tracking node tree 300. As used herein, "distributing" the fingerprint entries refers to moving the fingerprint entries to a set of child nodes 320, such that the fingerprint entries are no longer present in the source node 320.

In some implementations, the fingerprint entries may be distributed to a set of nodes 320 based on a level-shifted bitmask applied to the fingerprints. For example, referring now to FIG. 3B, shown is an example fingerprint 305 that includes eight bits. In some implementations, a bitmask may be applied to the fingerprint 305 to block all but two adjacent bits (e.g., bits 0-1). Further, the bitmask may be shifted up by two bits for every level downward in the tracking node tree 300. For example, referring to FIG. 3A, the first level including nodes 320B-320E uses the different combinations of bit positions 0-1 to distribute the fingerprints. As shown, node 320B receives all fingerprint entries (flushed from root node 320A) having the value "00" in bit positions 0-1. Similarly, node 320C receives all fingerprint entries with the value "01" in bit positions 0-1, node 320D receives all fingerprint entries with the value "10" in bit positions 0-1, and node 320E receives all fingerprint entries with the value "11" in bit positions 0-1.

Further, the second level including nodes 320E-320I uses the different combinations of bit positions 2-3 to distribute the fingerprints. As shown, node 320F receives all fingerprint entries (flushed from node 320C) having the value "00" in bit positions 2-3, node 320G receives all fingerprint entries with the value "01" in bit positions 2-3, node 320H receives all fingerprint entries with the value "10" in bit positions 2-3, and node 320I receives all fingerprint entries with the value "11" in bit positions 2-3. Furthermore, while not shown in FIG. 3A, the tracking node tree 300 may include additional levels that correspond to different bit positions of the fingerprints, until all bit positions are used. For example, the tracking node tree 300 could include a third level that uses different combinations of bit positions 5-6, and also includes a fourth level that uses different combinations of bit positions 7-8.

In some implementations, the nodes 320 of the tracking node tree 300 may be generated in stepwise fashion from the top to the bottom of the tree structure. For example, upon initializing the tracking node tree 300 (e.g., at time of first use), the tracking node tree 300 may only include the root node 320A. An example operation for generating the tracking node tree 300 is described below with reference to FIGS. 4A-4F.

Note that, while FIGS. 3A-3C show some example implementations, other implementations are possible. For example, the tracking node tree 300 may include any number levels and/or nodes, may use fingerprints of different lengths, may use different numbers or combinations of bit positions to route fingerprints, and so forth.

FIGS. 4A-4F—Example Operation for Generating a Tracking Node Tree

Figure 4A:
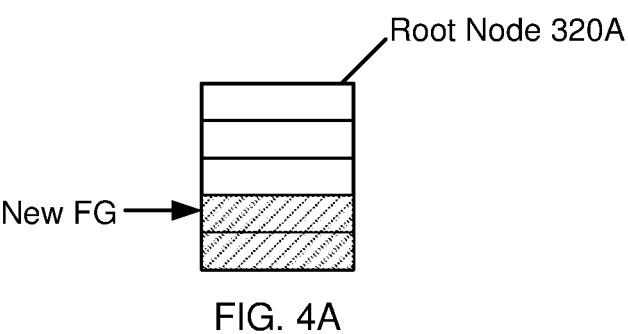
FIGS. 4A-4F are illustrations of an example operation, in accordance with some implementations.

FIGS. 4A-4F illustrate an example operation for generating the tracking node tree 300, in accordance with some implementations. Referring now to FIG. 4A, illustrated is tracking node tree 300 at a first point in time. The tracking node tree 300 includes a root node 320A. As shown, the root node 320A has received a new fingerprint entry ("New FG"), and therefore stores two fingerprint entries (each illustrated as a shaded rectangle). Further, the root node 320A has a remaining capacity for three additional fingerprint entries (each illustrated as an empty rectangle).

Figure 4B:
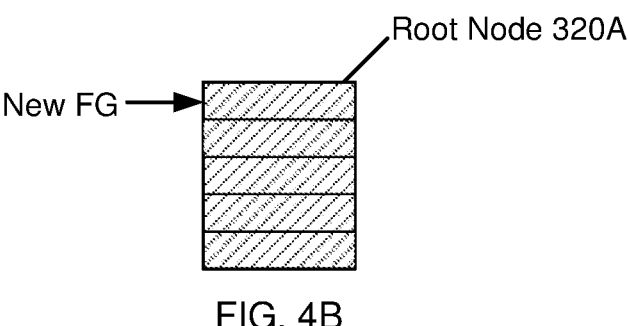

Referring now to FIG. 4B, illustrated is tracking node tree 300 at a second point in time. As shown, the root node 320A has received another new fingerprint entry, and therefore stores five fingerprint entries. In the example of FIG. 4B, the root node 320A has reached its maximum capacity for fingerprint entries. Accordingly, the fingerprint entries stored in the root node 320A are to be flushed to the next level in the tracking node tree 300.

Figure 4C:
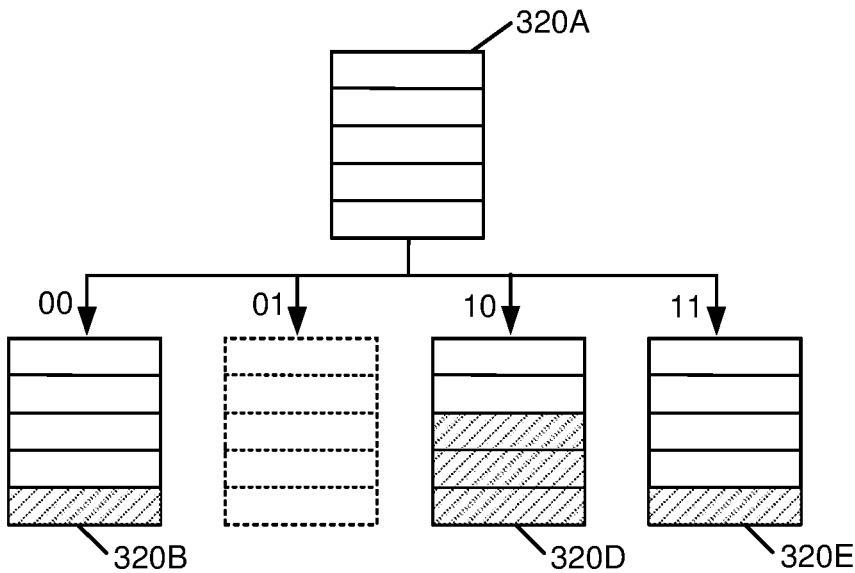

Referring now to FIG. 4C, illustrated is tracking node tree 300 at a third point in time. As shown in FIG. 4C, since the root node 320A did not previously have any child nodes, the new child nodes 320B, 320D, and 320E are generated to store the five fingerprint entries that are flushed from the root node 320A. Note that, in the example of FIG. 4C, none of the flushed fingerprint entries included the value "01" in bit positions 0-1 of their fingerprints. Accordingly, the new level added to the tracking node tree 300 does not yet include a node that is allocated to receive fingerprint entries with the value "01" in bit positions 0-1 (e.g., node 320C shown in FIG. 3A).

Figures 4D, 4E:
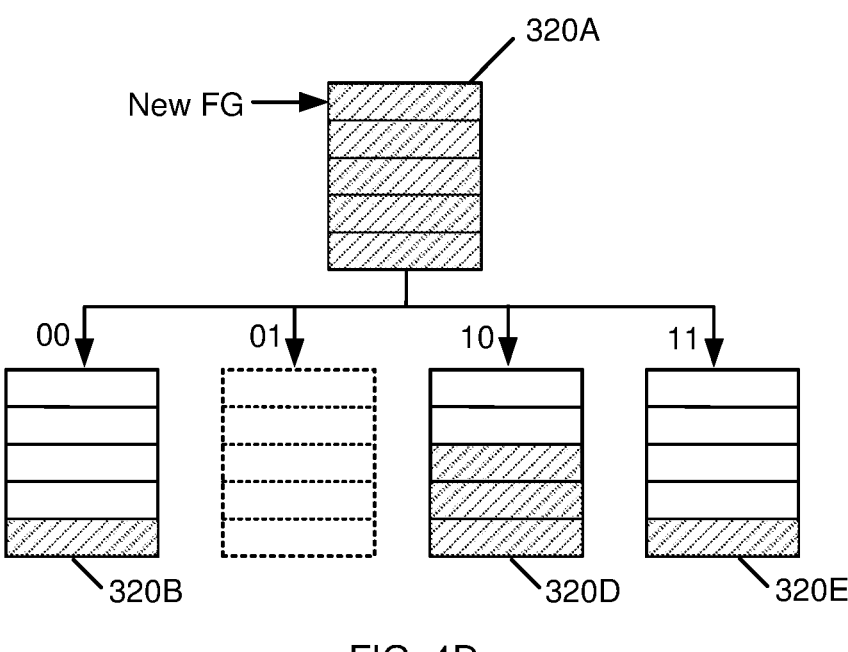

Referring now to FIG. 4D, illustrated is tracking node tree 300 at a fourth point in time. As shown in FIG. 4D, the root node 320A has again reached its maximum capacity for fingerprint entries. Accordingly, the fingerprint entries stored in the root node 320A are to be flushed to the next level in the tracking node tree 300.

Referring now to FIG. 4E, illustrated is tracking node tree 300 at a fifth point in time. As shown in FIG. 4E, two of the flushed fingerprint entries included the value "01" in bit positions 0-1 of their fingerprints. Accordingly, a new child node 320C is generated to store the two flushed fingerprint entries with the value "01" in bit positions 0-1. Further, in the example of FIG. 4E, the node 320D has now reached its maximum capacity for fingerprint entries. Accordingly, the fingerprint entries stored in the node 320D are to be flushed to the next level in the tracking node tree 300.

Figure 4F:
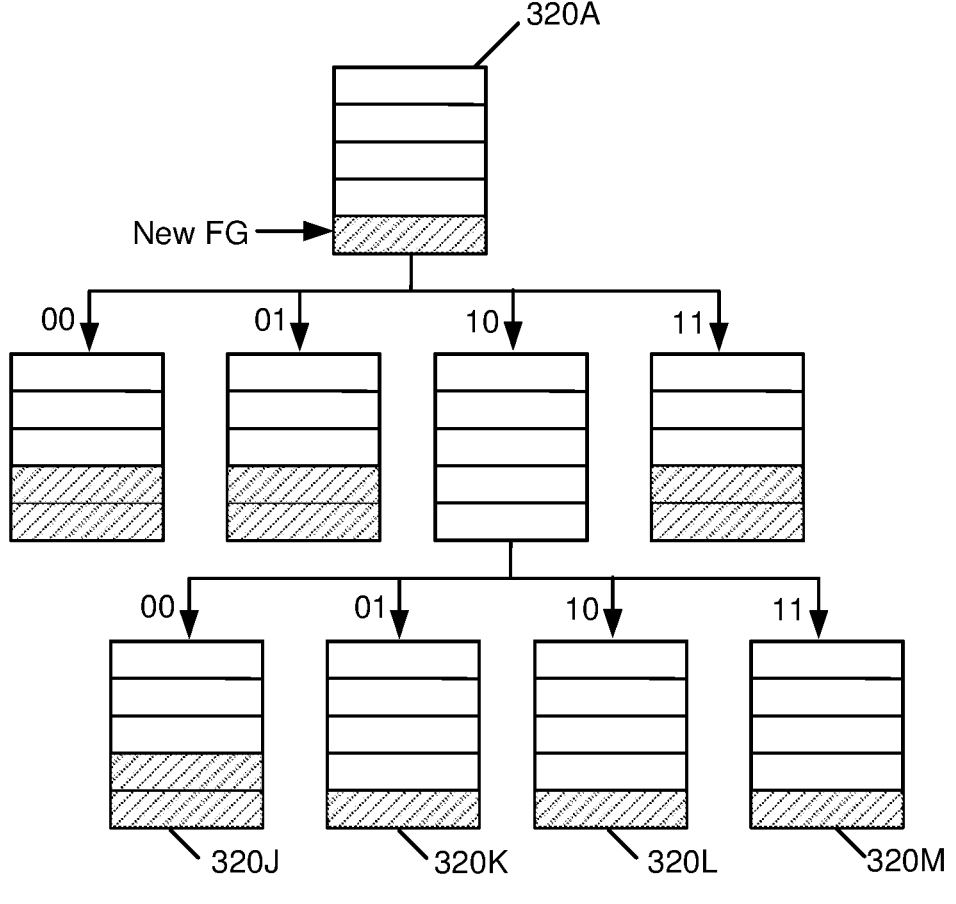

Referring now to FIG. 4F, illustrated is tracking node tree 300 at a sixth point in time. As shown in FIG. 4F, since the node 320D did not previously have any child nodes, the new child nodes 320J, 320K, 320L, and 320M are generated to store the five fingerprint entries that are flushed from the node 320D. In this manner, additional node levels may be added to the tracking node tree 300 to accommodate new fingerprint entries that are loaded into the root node 320A and then propagate through the levels of the tracking node tree 300.

Figure 5:
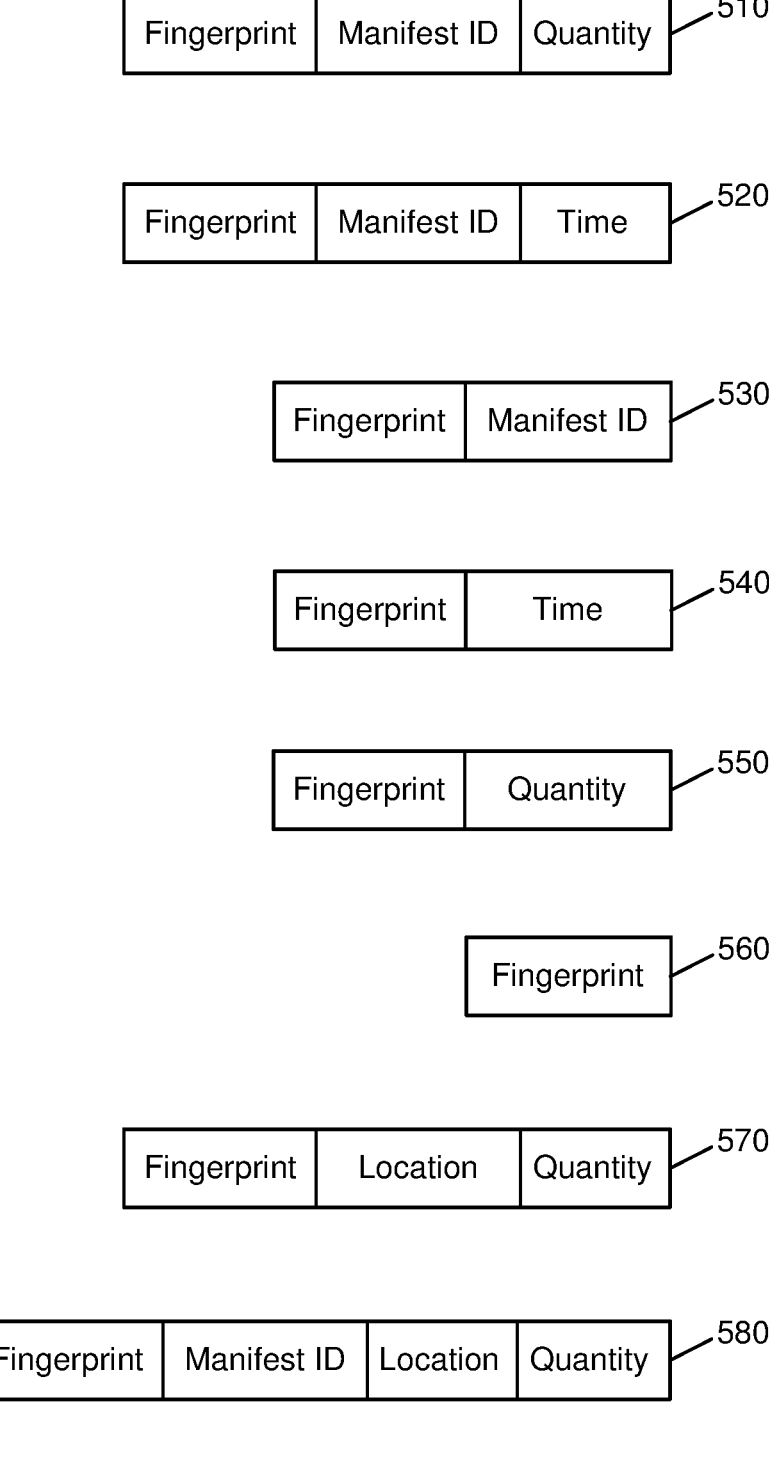
FIG. 5 is an illustration of example data formats, in accordance with some implementations.

FIG. 5—Example Data Formats

FIG. 5 illustrates example data formats of fingerprint entries, in accordance with some implementations. In some examples, the fingerprint entries may be stored in the fingerprint tracking structure 135 (shown in FIG. 1).

As shown, format 510 may include fields to store a fingerprint, an identifier for a manifest, and a quantity of data units. The fingerprint may be a value derived by applying a function (e.g., a hash function) to the content of a received data unit. The manifest identifier may identify the manifest that references the received data unit. In some implementations, the manifest identifier may be used to determine all data stream locations of data units with a particular fingerprint. For example, upon receiving a tracking query that requests the data stream locations for a specified fingerprint, a controller traverses the single path in the fingerprint tracking structure 135 that corresponds to the specified fingerprint, and collects the manifest identifiers included in each fingerprint entry for the specified fingerprint. The collected manifest identifiers may then be used to identify all data stream locations for the specified fingerprint.

The quantity value may indicate the number of instances of the received data unit. Initially, upon generating the fingerprint entry, the quantity may be set to one. Subsequently, if two fingerprint entries for the same fingerprint are stored in the same node, those two fingerprint entries may be combined into one fingerprint entry. In some implementations, the quantity value of the combined fingerprint entry may be the sum of the quantity values of the two fingerprint entries that were combined.

As shown, format 520 may include fields to store a fingerprint, an identifier for a manifest, and a time stamp. The time stamp may indicate the date and time that the data unit was received by the storage system. Format 530 may include fields to store a fingerprint and a manifest identifier.

As shown, format 540 may include fields to store a fingerprint and a time stamp. Format 550 may include fields to store a fingerprint and a quantity value. Format 560 may only include a single field to store a fingerprint. In some implementations, formats that do not include a manifest identifier (e.g., formats 540, 550, 560) may be used if the fingerprint tracking structure 135 is not implemented to determine the data stream locations for a fingerprint. For example, the fingerprint tracking structure 135 may be implemented to determine whether data units with a specified fingerprint are stored in a system, but without needing to determine their data stream locations.

In some implementations, formats that do not include a quantity value (e.g., formats 520, 530, 540, 560) may be used if the fingerprint tracking structure 135 is not implemented to determine the number of stored data units with a specified fingerprint. For example, the fingerprint tracking structure 135 may be implemented to determine whether any data units with a specified fingerprint are stored in a system, but without needing to determine the quantity of the stored data units.

As shown, format 570 may include fields to store a fingerprint, a location, and a quantity value. Format 580 may include fields to store a fingerprint, a manifest identifier, a location identifier, and a quantity value. The location identifier may indicate the storage location for the data unit (e.g., data container, offset, etc.). In some implementations, formats that include a location identifier (e.g., formats 570, 580) may be used if the fingerprint tracking structure 135 is implemented to perform deduplication of stored data units (e.g., instead of performing deduplication using container indexes). For example, in a storage system using the tracking node tree 300 (shown in FIG. 3A) to perform deduplication of data units, fingerprint entries are created for all data units that are received in a data stream. Each fingerprint entry is loaded into the root node 320A, and subsequently propagates down along a single node path through the tracking node tree 300. If two fingerprint entries for the same fingerprint are stored in the same node 320, the data units represented by those two fingerprint entries are deduplicated in the storage system. In such implementations, the location identifier in one of the two fingerprint entries is used to delete the corresponding data unit from persistent storage, thereby leaving one deduplicated data unit (identified by the location identifier in the other of the two fingerprint entries). Further, the two fingerprint entries may be combined into one fingerprint entry, and the quantity value of the combined fingerprint entry may the sum of the quantity values of the two fingerprint entries that were combined. Furthermore, if the fingerprint entries include manifest identifiers (e.g., format 580), the combined fingerprint entry may include the manifest identifiers from the two fingerprint entries that were combined.

FIGS. 6A-6E—Example Operations for Storing Fingerprint Entries

FIGS. 6A-6E illustrate various example operations for storing a new fingerprint entry ("New FG) in a node buffer 325, in accordance with some implementations. The node buffer 325 may be included in a node 320 of the tracking node tree 300 (shown in FIG. 3A).

Referring now to FIG. 6A, the node buffer 325 stores two previous fingerprint entries for fingerprints "A" and "X," and is loaded with a new fingerprint entry for fingerprint "A." In some implementations, upon determining that two fingerprint entries for the same fingerprint are stored in the same node buffer 325, a controller may combine those two fingerprint entries into one fingerprint entry. For example, as shown in FIG. 6A, the two fingerprint entries for fingerprint "A" are combined into one fingerprint entry, and the quantity value ("2") of the combined fingerprint entry is the sum of the quantity values of the two fingerprint entries that were combined. Further, in some implementations, the combined fingerprint entry for fingerprint "A" includes all manifest identifiers (e.g., "MA: 1" and "MA: 3") from the two fingerprint entries that were combined.

Referring now to FIG. 6B, upon determining that two fingerprint entries for fingerprint "A" are stored in the same node buffer 325, a controller combines those two fingerprint entries into one fingerprint entry. As shown, the combined fingerprint entry includes all time stamp values (e.g., "TS: t1" and "TS: t5") from the two fingerprint entries that were combined.

Referring now to FIG. 6C, upon determining that two fingerprint entries for fingerprint "A" are stored in the same node buffer 325, a controller combines those two fingerprint entries into one fingerprint entry. As shown, the quantity value ("2") of the combined fingerprint entry is the sum of the quantity values of the two fingerprint entries that were combined.

In other implementations, if two fingerprint entries for the same fingerprint are stored in the same node buffer 325, those two fingerprint entries may be not be combined. For example, referring now to FIG. 6D, the two fingerprint entries for fingerprint "A" are stored as separate fingerprint entries in the node buffer 325.

Figure 6D:
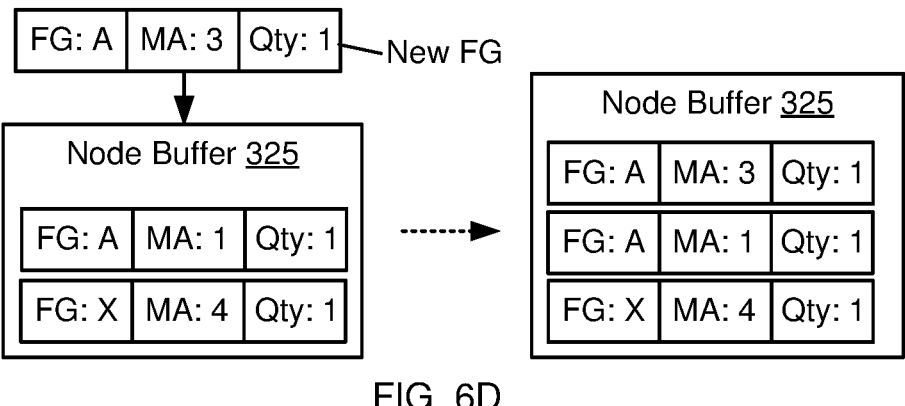
Figure 6E:
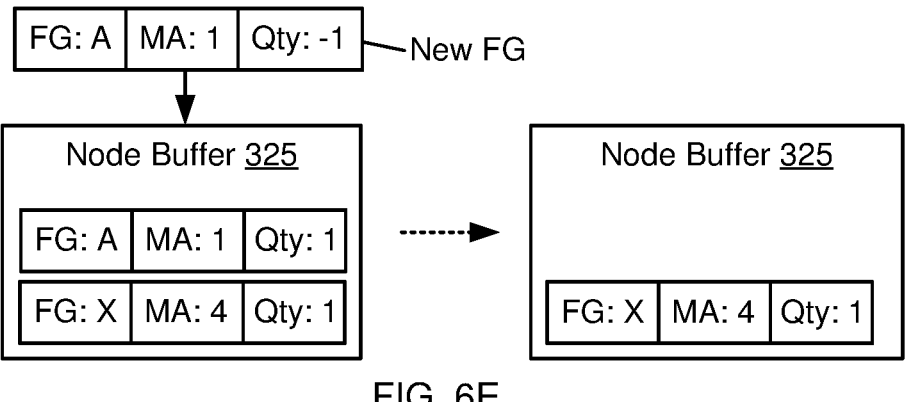

In some implementations, when a data unit is deleted or otherwise removed from the storage system, the fingerprint entry that represents the deleted data unit may be removed from the tracking node tree 300. This removal may be performed by inserting a new fingerprint entry that matches the fingerprint entry to be removed, but which includes the negation (i.e., negative version) of the quantity value of the fingerprint entry to be removed. For example, referring now to FIG. 6E, the node buffer 325 stores a first fingerprint entry with fingerprint "A," manifest identifier "MA: 1," and quantity value "1." If the first fingerprint entry is to be deleted from the tracking node tree 300 (e.g., when the data unit represented by the first fingerprint entry has been deleted), the node buffer 325 is loaded with a second fingerprint entry with fingerprint "A," manifest identifier "MA: 1," and quantity value "–1" (i.e., the negation of "1"). Accordingly, when the first and second fingerprint entries are combined, the resulting quantity value is "0." As shown in FIG. 6E, in some implementations, a fingerprint entry with quantify value "0" may be deleted from the node buffer 325. In this manner, the fingerprint entries that represent deleted data units may be removed from the tracking node tree 300.

Figure 7:
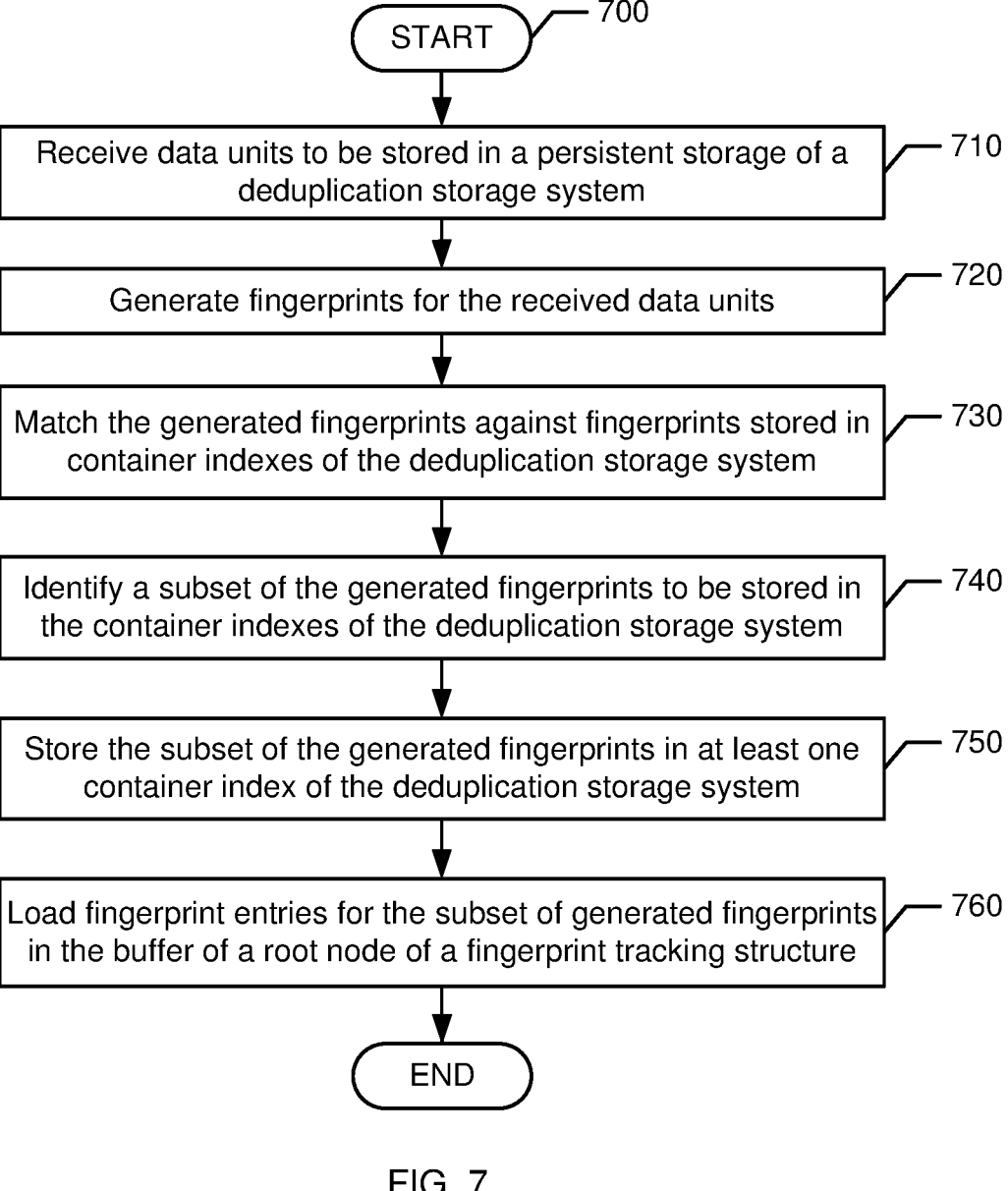
FIG. 7 is an illustration of an example process, in accordance with some implementations.

FIG. 7—Example Process for Generating a Fingerprint Tracking Structure

FIG. 7 shows is an example process 700 for generating a fingerprint tracking structure, in accordance with some implementations. For the sake of illustration, details of the process 700 may be described below with reference to FIGS. 1-6E, which show examples in accordance with some implementations. However, other implementations are also possible. In some examples, the process 700 may be performed using the storage controller 110 (shown in FIG. 1). The process 700 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 710 may include receiving data units to be stored in persistent storage of a deduplication storage system. Block 720 may include generating fingerprints for the received data units. For example, referring to FIGS. 1-2, the deduplication engine 120 receives the data stream 105 including multiple data units, and may store at least one copy of each data unit in a data container 250. The deduplication engine 120 generates a fingerprint for each data unit (e.g., a full or partial hash value).

Block 730 may include matching the generated fingerprints against fingerprints stored in container indexes of the deduplication storage system. Block 740 may include identifying a subset of the generated fingerprints to be stored in the container indexes of the deduplication storage system. Block 750 may include storing the subset of the generated fingerprints in at least one container index of the deduplication storage system. For example, referring to FIGS. 1-2, the deduplication engine 120 compares the fingerprint generated for the incoming data unit to fingerprints stored in container indexes 220. The inbound data units with fingerprints that match the stored fingerprints in container indexes 220 are determined to be copies of previous data units that are already included in stored data 122, and the deduplication engine 120 then stores references to the previous data units in stored data 122 (instead of storing the duplicate incoming data units). Further, the remaining inbound data units with fingerprints that do not match the stored fingerprints are determined to be new data units. The deduplication engine 120 stores the new data units in the stored data 122, and updates the deduplication metadata 125 to record information about the new data units.

Block 760 may include loading fingerprint entries for the subset of generated fingerprints in the buffer of a root node of a fingerprint tracking structure. After block 760, the process 700 may be completed. For example, referring to FIGS. 1-3, the fingerprint tracking engine 130 load a set of fingerprint entries for the subset of fingerprints into the root node 320A of the tracking node tree 300.

Figure 8:
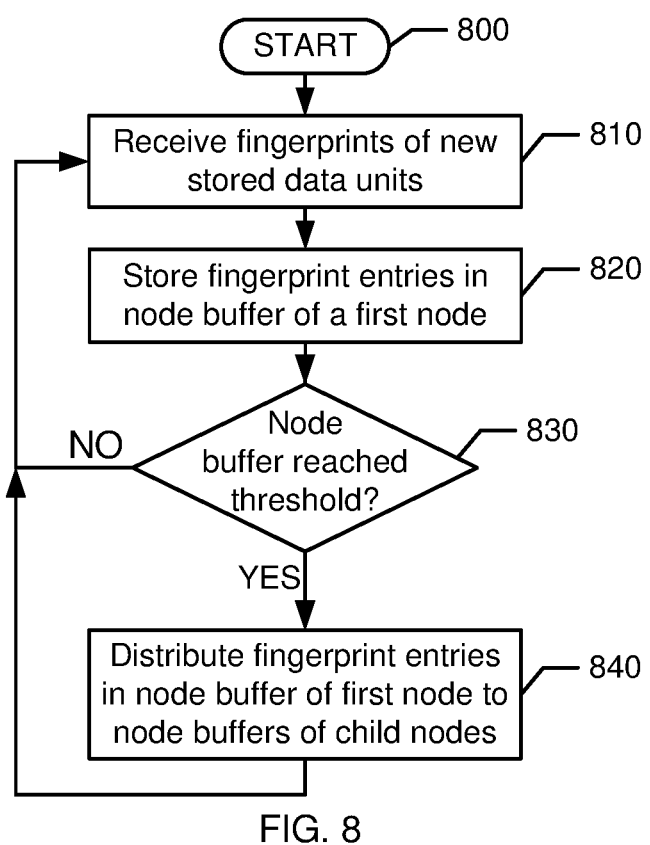
FIG. 8 is an illustration of an example process, in accordance with some implementations.

FIG. 8—Example Process for Generating a Fingerprint Tracking Structure

FIG. 8 shows is an example process 800 for generating a fingerprint tracking structure, in accordance with some implementations. For the sake of illustration, details of the process 800 may be described below with reference to FIGS. 1-6E, which show examples in accordance with some implementations. However, other implementations are also possible. In some examples, the process 800 may be performed using the storage controller 110 (shown in FIG. 1). The process 800 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 810 may include receiving fingerprints of new stored data units. Block 820 may include storing fingerprint entries in a node buffer of a first node. Decision block 830 may include determining whether the node buffer of the first node has reached a threshold level. If not, the process 800 may return to block 810 (i.e., to continue fingerprints of new stored data units). Otherwise, if the node buffer of the first node has reached the threshold level, the process 800 may continue at block 840, including distributing the fingerprint entries from the node buffer of first node to node buffers of child nodes.

For example, referring to FIGS. 1-3A, the fingerprint tracking engine 130 continues to load fingerprint entries into the node buffer 325 of the root node 320A. When the node buffer 325 of the root node 320A is filled to a maximum level, the fingerprint entries stored in the node buffer 325 of the root node 320A are distributed among nodes 320B-320E. In another example, when the node buffer 325 of node 320C is filled to a maximum level, the fingerprint entries stored in the node buffer 325 of node 320C are distributed among nodes 320E-320I. In some implementations, the fingerprint entries may be distributed to a set of child nodes 320 based on a level-shifted bitmask applied to the fingerprint of each fingerprint entry.

Figure 9:
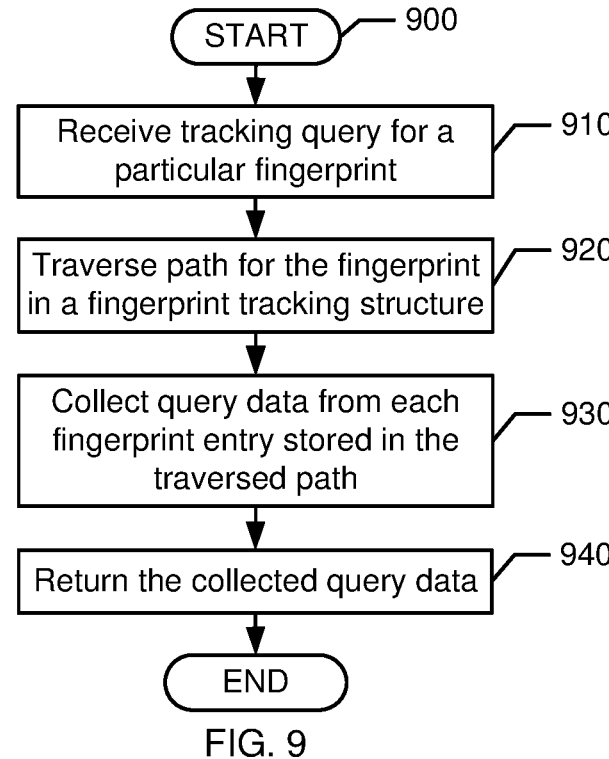
FIG. 9 is an illustration of an example process, in accordance with some implementations.

FIG. 9—Example Process for Executing a Tracking Query

FIG. 9 shows is an example process 900 for executing a tracking query, in accordance with some implementations. For the sake of illustration, details of the process 900 may be described below with reference to FIGS. 1-6E, which show examples in accordance with some implementations. However, other implementations are also possible. In some examples, the process 900 may be performed using the storage controller 110 (shown in FIG. 1). The process 900 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 910 may include receiving a tracking query for a particular fingerprint. Block 920 may include traversing the path for the fingerprint in a fingerprint tracking structure. Block 930 may include collecting query data from each fingerprint entry stored in the traversed path. Block 940 may include returning the collected query data. After block 940, the process 900 may be completed.

For example, referring to FIGS. 1-3A, the fingerprint tracking engine 130 receives a tracking query 107 requesting tracking information about a particular fingerprint. In response, the fingerprint tracking engine 130 traverses the single node path (i.e., a set of nodes 320) in tracking node tree 300 that corresponds to the particular fingerprint, and collects tracking information from each fingerprint entry for that fingerprint that are found in the traversed nodes. The fingerprint tracking engine 130 then provides this collected tracking information in a response to the tracking query 107 (e.g., provided to a user, an application, and so forth).

Figure 10A:
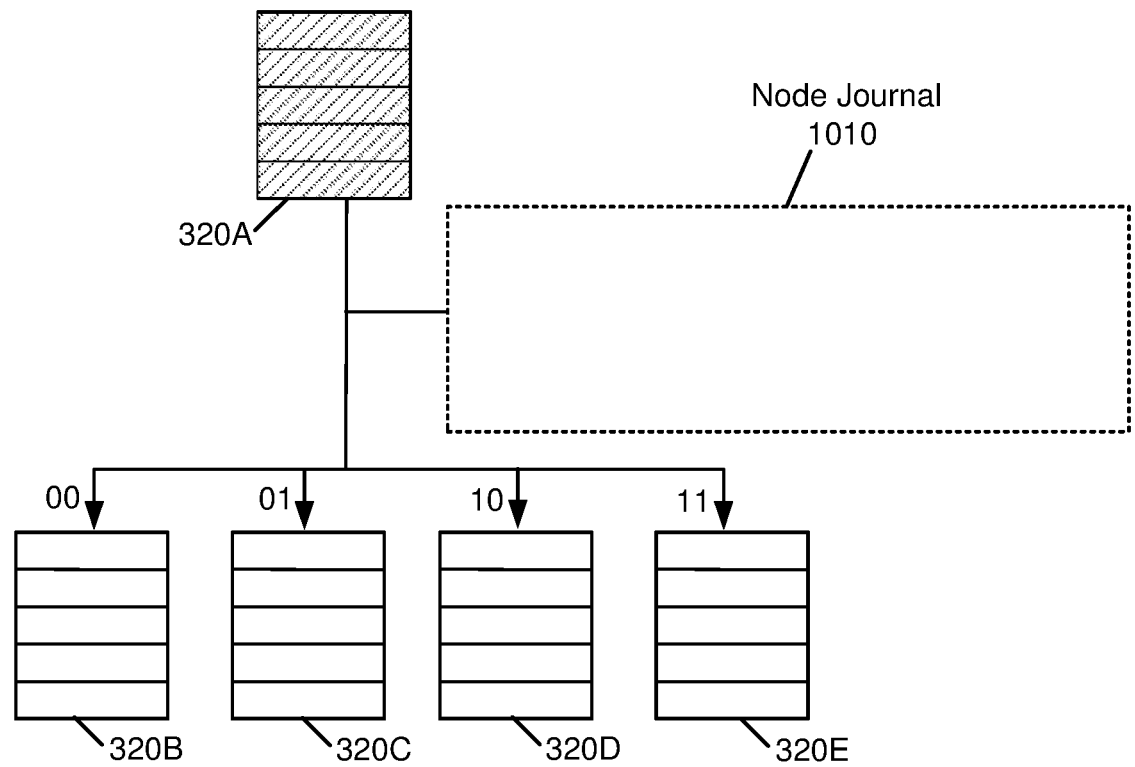
FIGS. 10A-10C are illustrations of an example operation, in accordance with some implementations.
Figure 10B:
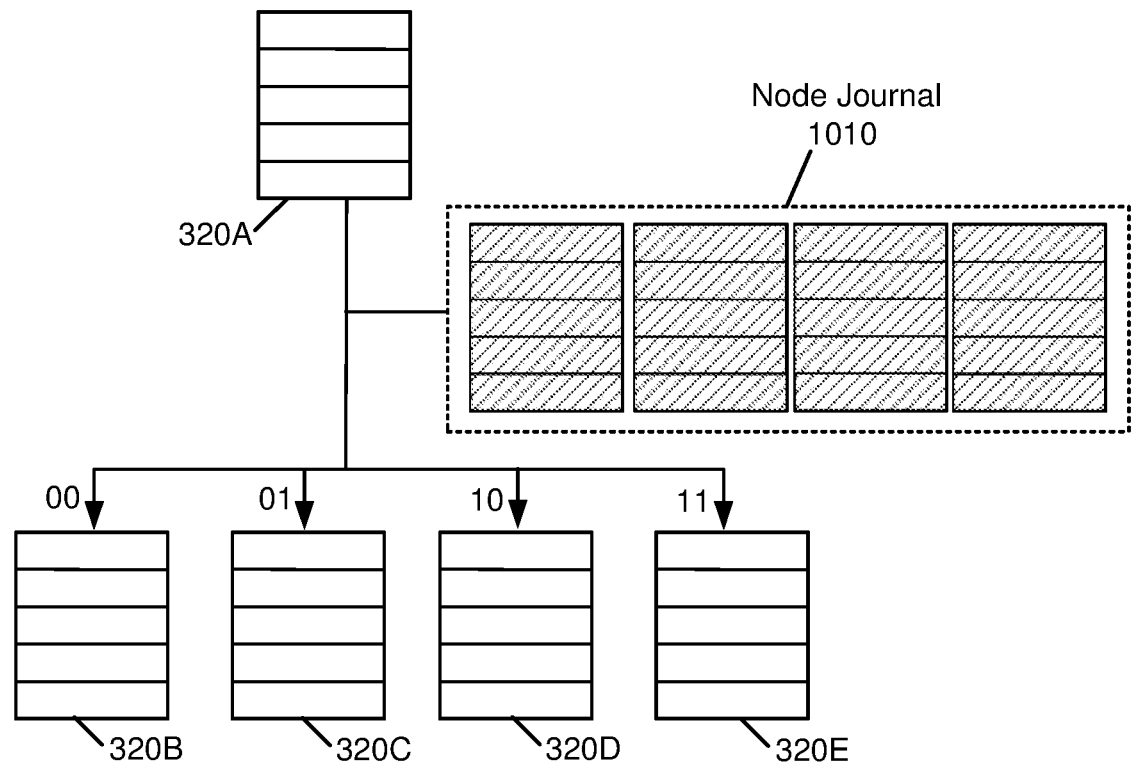
Figure 10C:
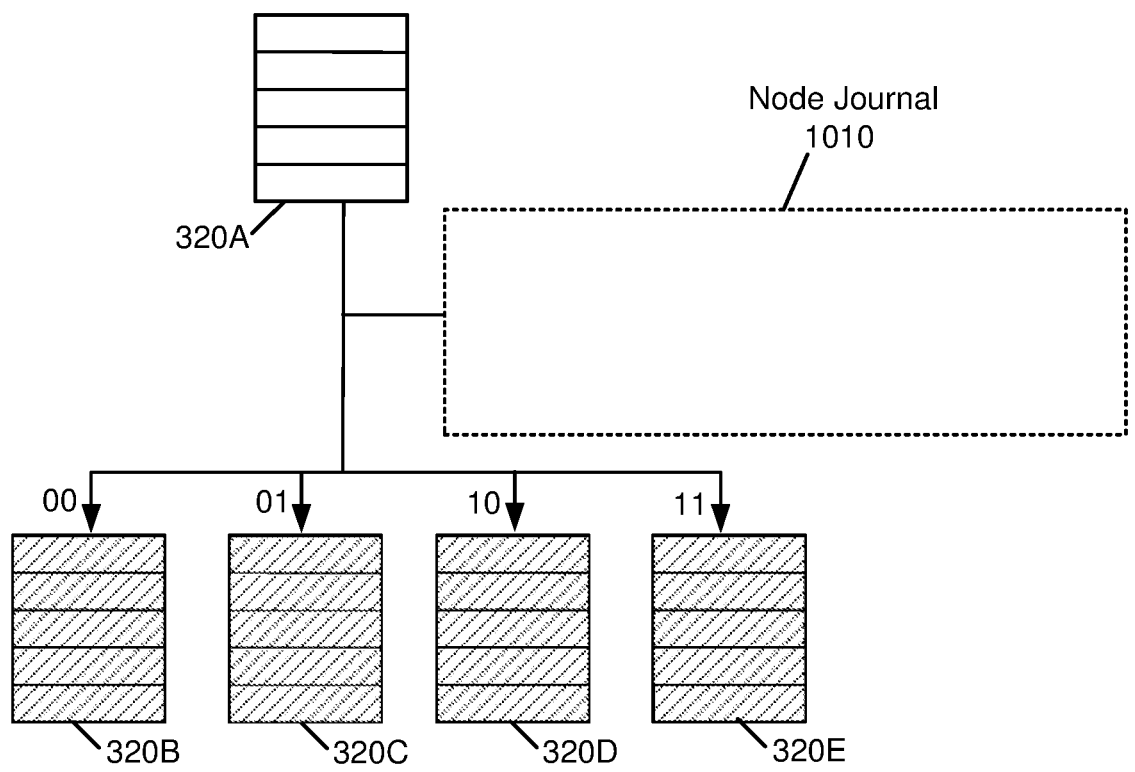

FIGS. 10A-10C—Example Operation for Journaling Node Updates

FIGS. 10A-10C illustrate an example operation for journaling node updates, in accordance with some implementations. Referring now to FIG. 10A, illustrated is tracking node tree 300 at a first point in time. The tracking node tree 300 includes a parent node 320A and four child nodes 320B-320E. As shown, the parent node 320A has reached its maximum capacity for fingerprint entries (e.g., five), and therefore the stored fingerprint entries are to be distributed from the parent node 320A.

In some examples, if the fingerprint entries are distributed directly to the child nodes 320B-320E, the child nodes 320B-320E are first loaded (e.g., using read I/Os) from persistent storage 140 into memory 115 (shown in FIG. 1), and are then updated to include their respective sets of fingerprint entries that are distributed from the root node 320A. Once updated, the child nodes 320B-320E may be written back from memory 115 to the persistent storage 140 (e.g., using write I/Os). This update process may be repeated for each distribution of fingerprint entries from the parent node 320A. Accordingly, because this repeated update process involves multiple read I/Os and write I/Os of the child nodes 320B-320E, the repeated update process may consume relatively large amounts of system processing time and bandwidth, and may thereby reduce the performance of the storage system.

In some implementations, instead of distributing the fingerprint entries directly to the child nodes 320B-320E, the fingerprint entries may be temporarily stored in a node journal 1010. Once the node journal 1010 reaches a maximum storage capacity, the fingerprint entries stored in the node journal 1010 may be distributed to the appropriate child nodes 320B-320E.

For example, referring to FIG. 10B, the parent node 320A has reached its maximum storage capacity for fingerprint entries four times, and therefore has transferred four sets of fingerprint entries into the node journal 1010. Further, the node journal 1010 has now reached its maximum storage capacity of four sets of fingerprint entries. Accordingly, as shown in FIG. 10C, the fingerprint entries stored in the node journal 101 are distributed to the child nodes 320B-320E (e.g., based on bit values of the fingerprints). In this manner, the number of read I/Os and write I/Os of the child nodes 320B-320E needed to store a number of fingerprint entries may be less than the number of read I/Os and write I/Os that would required if the same number of fingerprint entries were distributed directly to the child nodes 320B-320E. Accordingly, using the node journal 1010 may reduce the amounts of system processing time and bandwidth required for processing node updates.

FIG. 11—Example Machine-Readable Medium

FIG. 11 shows a machine-readable medium 1100 storing instructions 1110-1150, in accordance with some implementations. The instructions 1110-1150 can be executed by a single processor, multiple processors, a single processing engine, multiple processing engines, and so forth. The machine-readable medium 1100 may be a non-transitory storage medium, such as an optical, semiconductor, or magnetic storage medium.

Instruction 1110 may be executed to receive a stream of data units to be stored in a persistent storage of a deduplication storage system. Instruction 1120 may be executed to generate a fingerprint for each data unit of the stream of data units. Instruction 1130 may be executed to identify a set of fingerprints to be stored in a plurality of container indexes, the plurality of container indexes comprising metadata indicating storage locations of data units stored in the persistent storage of the deduplication storage system.

Instruction 1140 may be executed to store the identified set of fingerprints in at least one container index of the plurality of container indexes. Instruction 1150 may be executed to load fingerprint entries for the identified set of fingerprints in a root node of a fingerprint tracking structure, the fingerprint tracking structure to identify each data unit stored in the persistent storage of the deduplication storage system.

Figure 12:
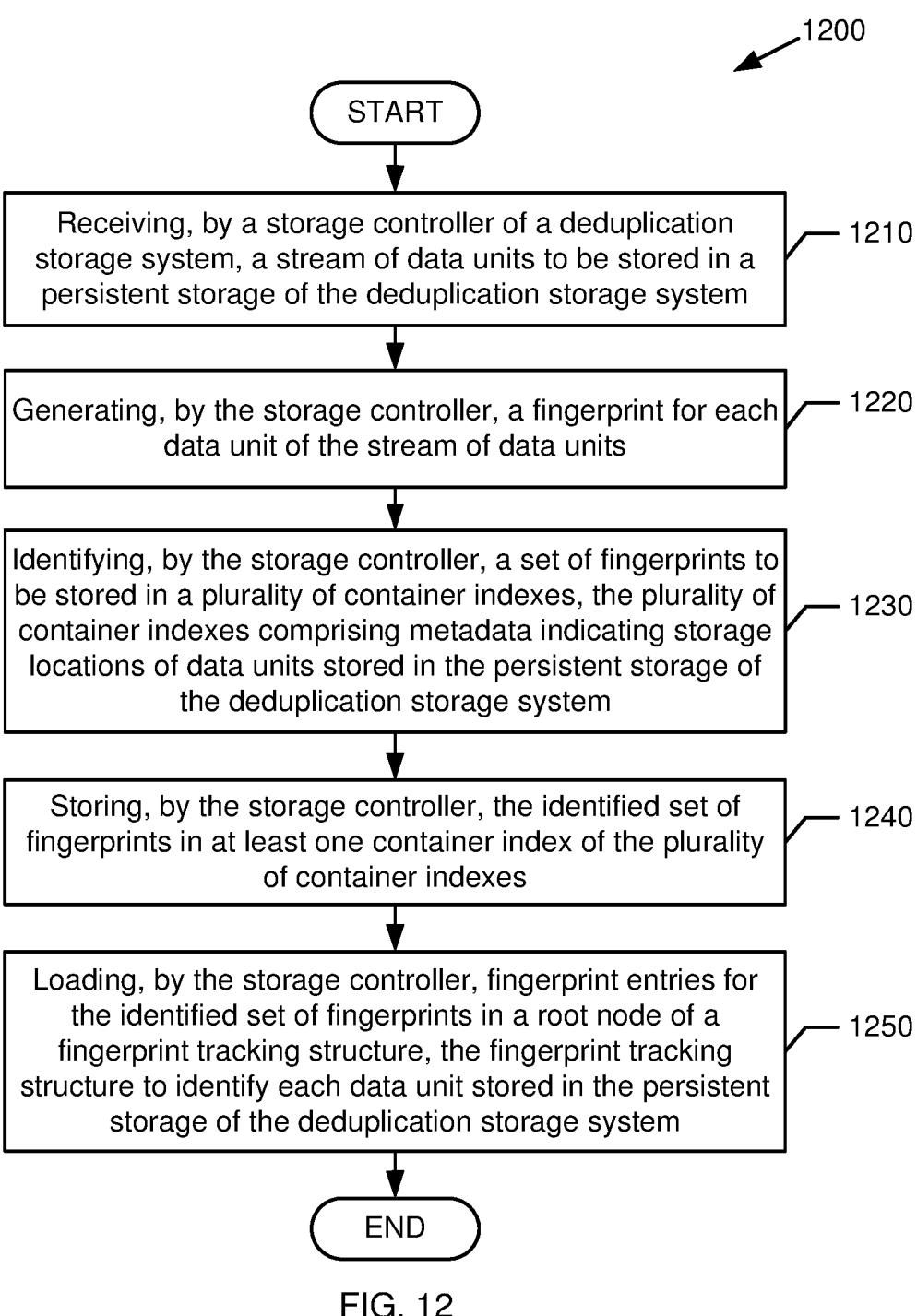
FIG. 12 is an illustration of an example process, in accordance with some implementations.

FIG. 12—Example Process

FIG. 12 shows is an example process 1200, in accordance with some implementations. In some examples, the process 1200 may be performed using the storage controller 110 (shown in FIG. 1). The process 1200 may be implemented in hardware or a combination of hardware and programming (e.g., machine-readable instructions executable by a processor(s)). The machine-readable instructions may be stored in a non-transitory computer readable medium, such as an optical, semiconductor, or magnetic storage device. The machine-readable instructions may be executed by a single processor, multiple processors, a single processing engine, multiple processing engines, and so forth.

Block 1210 may include receiving, by a storage controller of a deduplication storage system, a stream of data units to be stored in a persistent storage of the deduplication storage system. Block 1220 may include generating, by the storage controller, a fingerprint for each data unit of the stream of data units.

Block 1230 may include identifying, by the storage controller, a set of fingerprints to be stored in a plurality of container indexes, the plurality of container indexes comprising metadata indicating storage locations of data units stored in the persistent storage of the deduplication storage system. Block 1240 may include storing, by the storage controller, the identified set of fingerprints in at least one container index of the plurality of container indexes. Block 1250 may include loading, by the storage controller, fingerprint entries for the identified set of fingerprints in a root node of a fingerprint tracking structure, the fingerprint tracking structure to identify each data unit stored in the persistent storage of the deduplication storage system.

FIG. 13—Example Computing Device

FIG. 13 shows a schematic diagram of an example computing device 1300. In some examples, the computing device 1300 may correspond generally to some or all of the storage system 100 (shown in FIG. 1). As shown, the computing device 1300 may include a hardware processor 1302, a memory 1304, and machine-readable storage 1305 including instructions 1310-1350. The machine-readable storage 1305 may be a non-transitory medium. The instructions 1310-1350 may be executed by the hardware processor 1302, or by a processing engine included in hardware processor 1302.

Instruction 1310 may be executed to receive a stream of data units to be stored in a persistent storage of a deduplication storage system. Instruction 1320 may be executed to generate a fingerprint for each data unit of the stream of data units. Instruction 1330 may be executed to identify a set of fingerprints to be stored in a plurality of container indexes, the plurality of container indexes comprising metadata indicating storage locations of data units stored in the persistent storage of the deduplication storage system.

Instruction 1340 may be executed to store the identified set of fingerprints in at least one container index of the plurality of container indexes. Instruction 1350 may be executed to load fingerprint entries for the identified set of fingerprints in a root node of a fingerprint tracking structure, the fingerprint tracking structure to identify each data unit stored in the persistent storage of the deduplication storage system.

In accordance with implementations described herein, a storage system may include deduplication metadata and a fingerprint tracking structure. The storage system may use the deduplication metadata to deduplicate received data units. The fingerprints of new data units may be included in fingerprint entries that are loaded in the fingerprint tracking structure. In some implementations, each fingerprint entry includes a single fingerprint, and each fingerprint entry is routed along a node path through the fingerprint tracking structure based on the single fingerprint included in that fingerprint entry. Each node path may include one node per level of the fingerprint tracking structure. Further, if two fingerprint entries for the same fingerprint are stored in the same node, these duplicate fingerprint entries may be merged into a single fingerprint entry. In some implementations, upon receiving a tracking query for a particular fingerprint, the storage system may traverse the corresponding path in the tracking tree structure, and may collect tracking information from the fingerprint entries for that fingerprint that are stored in the traversed path. In this manner, use of the fingerprint tracking structure may provide a relatively rapid and efficient processing of tracking queries, and may thereby improve the performance of the deduplication storage system.

Note that, while FIGS. 1-13 show various examples, implementations are not limited in this regard. For example, referring to FIG. 1, it is contemplated that the storage system 100 may include additional devices and/or components, fewer components, different components, different arrangements, and so forth. In another example, it is contemplated that the functionality of the storage controller 110 described above may be included in any another engine or software of storage system 100. Other combinations and/or variations are also possible.

Data and instructions are stored in respective storage devices, which are implemented as one or multiple computer-readable or machine-readable storage media. The storage media include different forms of non-transitory memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A computing device comprising:
a processor;
a memory; and
a machine-readable storage storing instructions, the instructions executable by the processor to:
   receive a stream of data units to be stored in a persistent storage of a deduplication storage system;
   generate a fingerprint for each data unit of the stream of data units;
   identify a set of fingerprints to be stored in a plurality of container indexes, the plurality of container indexes comprising container index metadata for a plurality of data units stored in the persistent storage of the deduplication storage system, wherein the container index metadata indicates, for each data unit of the plurality of data units, a data container that stores the each data unit;
   store the identified set of fingerprints in the container index metadata of at least one container index of the plurality of container indexes; and
   load fingerprint entries for the identified set of fingerprints in a root node of a fingerprint tracking structure, the fingerprint tracking structure to identify each data unit stored in the persistent storage of the deduplication storage system, wherein the fingerprint tracking structure excludes the container index metadata indicating, for each data unit of the plurality of data units, the data container that stores the each data unit, wherein each fingerprint entry in the fingerprint tracking structure includes a particular fingerprint and tracking information for a particular data unit, and wherein the tracking information is to be provided in response to a tracking query for the particular fingerprint.

2. The computing device of claim 1, including instructions executable by the processor to:
   store the fingerprint entries in a node buffer of the root node;
   determine whether a set of fingerprint entries stored in the node buffer of the root node exceeds a threshold level; and
   in response to a determination that the set of fingerprint entries stored in the node buffer of the root node exceeds a threshold level, distribute the set of fingerprint entries stored in the node buffer of the root node to node buffers of a plurality of child nodes.

3. The computing device of claim 2, including instructions executable by the processor to:
   distribute the fingerprint entries based on a level-shifted bitmask applied to the fingerprints.

4. The computing device of claim 1, wherein each fingerprint entry includes a single fingerprint, wherein each fingerprint entry is routed along a node path through the fingerprint tracking structure based on the single fingerprint included in that fingerprint entry, and wherein each node path includes one node per level of the fingerprint tracking structure.

5. The computing device of claim 4, including instructions executable by the processor to:
   in response to a receipt of a tracking query for a first fingerprint, traverse the node path in the fingerprint tracking structure associated with the first fingerprint;
   collect the tracking information from each fingerprint entry for the first fingerprint that is stored in the traversed path; and
   provide the collected tracking information as a response to the tracking query, wherein the collected tracking information comprises at least one of a quantity and a location of a data unit having the first fingerprint.

6. The computing device of claim 1, including instructions executable by the processor to:
   in response to a determination that two fingerprint entries for a same fingerprint are stored in a node buffer, combine the two fingerprint entries into a combined fingerprint entry,
   wherein the combined fingerprint entry includes all manifest identifiers included in the two fingerprint entries, and wherein the combined fingerprint entry also includes a quantity value equal to a sum of two quality values from the two fingerprint entries.

7. The computing device of claim 1, wherein the container index metadata includes, for each data unit of the plurality of data units, a reference count indicating a total number of manifest records that reference the each data unit.

8. The computing device of claim 1, including instructions executable by the processor to:
   load a first fingerprint entry in the root node of the fingerprint tracking structure, the first fingerprint entry including a first fingerprint of a first data unit stored in the deduplication storage system, the first fingerprint entry also including a first quantity value;
   detect a deletion of the first data unit from the deduplication storage system; and
   in response to a detection of the deletion of the first data unit, load a second fingerprint entry in the root node of the fingerprint tracking structure, the second fingerprint entry including the first fingerprint of the first data unit, the second fingerprint entry also including a second quantity value equal to a negation of the first quantity value.

9. The computing device of claim 1, including instructions executable by the processor to:
   store the fingerprint entries in a node buffer of the root node;
   determine whether a first set of fingerprint entries stored in the node buffer of the root node exceeds a first threshold level;
   in response to a determination that the first set of fingerprint entries stored in the node buffer of the root node exceeds the first threshold level, transfer the fingerprint entries to a node journal;

determine whether a second set of fingerprint entries stored the node journal exceeds a second threshold level; and in response to a determination that the second set of fingerprint entries stored the node journal exceeds a second threshold level, distribute the second set of fingerprint entries stored in the node journal to node buffers of a plurality of child nodes.

10. A method comprising:

receiving, by a storage controller of a deduplication storage system, a stream of data units to be stored in a persistent storage of the deduplication storage system;

generating, by the storage controller, a fingerprint for each data unit of the stream of data units;

identifying, by the storage controller, a set of fingerprints to be stored in a plurality of container indexes, the plurality of container indexes comprising container index metadata for a plurality of data units stored in the persistent storage of the deduplication storage system, wherein the container index metadata indicates, for each data unit of the plurality of data units, a data container that stores the each data unit;

storing, by the storage controller, the identified set of fingerprints in the container index metadata of at least one container index of the plurality of container indexes; and loading, by the storage controller, fingerprint entries for the identified set of fingerprints in a root node of a fingerprint tracking structure, the fingerprint tracking structure to identify each data unit stored in the persistent storage of the deduplication storage system, wherein the fingerprint tracking structure excludes the container index metadata indicating, for each data unit of the plurality of data units, the data container that stores the each data unit, wherein each fingerprint entry in the fingerprint tracking structure includes a particular fingerprint and tracking information for a particular data unit, and wherein the tracking information is to be provided in response to a tracking query for the particular fingerprint.

11. The method of claim 10, further comprising:

storing the fingerprint entries in a node buffer of the root node;

determining whether a set of fingerprint entries stored in the node buffer of the root node exceeds a threshold level; and in response to a determination that the set of fingerprint entries stored in the node buffer of the root node exceeds a threshold level, distributing the set of fingerprint entries stored in the node buffer of the root node to node buffers of a plurality of child nodes.

12. The method of claim 10, wherein each fingerprint entry includes a single fingerprint, wherein each fingerprint entry is routed along a node path through the fingerprint tracking structure based on the single fingerprint included in that fingerprint entry, and wherein each node path includes one node per level of the fingerprint tracking structure.

13. The method of claim 12, further comprising:

receiving a tracking query for a first fingerprint;

in response to a receipt of the tracking query for the first fingerprint, traversing the node path in the fingerprint tracking structure associated with the first fingerprint;

collecting the tracking information from each fingerprint entry for the first fingerprint that is stored in the traversed path; and providing the collected tracking information as a response to the tracking query, wherein the collected tracking information comprises at least one of a quantity and a location of a data unit having the first fingerprint.

14. The method of claim 10, further comprising:

determining that two fingerprint entries for a same fingerprint are stored in a node buffer; and in response to a determination that the two fingerprint entries for the same fingerprint are stored in the node buffer, combining the two fingerprint entries into a combined fingerprint entry, wherein the combined fingerprint entry includes all manifest identifiers included in the two fingerprint entries, and wherein the combined fingerprint entry also includes a quantity value equal to a sum of two quality values from the two fingerprint entries.

15. The method of claim 10, further comprising:

loading a first fingerprint entry in the root node of the fingerprint tracking structure, the first fingerprint entry including a first fingerprint of a first data unit stored in the deduplication storage system, the first fingerprint entry also including a first quantity value;

detecting a deletion of the first data unit from the deduplication storage system; and in response to a detection of the deletion of the first data unit, loading a second fingerprint entry in the root node of the fingerprint tracking structure, the second fingerprint entry including the first fingerprint of the first data unit, the second fingerprint entry also including a second quantity value equal to a negation of the first quantity value.

16. A non-transitory machine-readable medium storing instructions that upon execution cause a processor to:

receive a stream of data units to be stored in a persistent storage of a deduplication storage system;

generate a fingerprint for each data unit of the stream of data units;

identify a set of fingerprints to be stored in a plurality of container indexes, the plurality of container indexes comprising container index metadata for a plurality of data units stored in the persistent storage of the deduplication storage system, wherein the container index metadata indicates, for each data unit of the plurality of data units, a data container that stores the each data unit;

store the identified set of fingerprints in the container index metadata of at least one container index of the plurality of container indexes; and load fingerprint entries for the identified set of fingerprints in a root node of a fingerprint tracking structure, the fingerprint tracking structure to identify each data unit stored in the persistent storage of the deduplication storage system, wherein the fingerprint tracking structure excludes the container index metadata indicating, for each data unit of the plurality of data units, the data container that stores the each data unit, wherein each fingerprint entry in the fingerprint tracking structure includes a particular fingerprint and tracking information for a particular data unit, and wherein the tracking information is to be provided in response to a tracking query for the particular fingerprint.

17. The non-transitory machine-readable medium of claim 16, including instructions executable by the processor to:

store the fingerprint entries in a node buffer of the root node;

determine whether a set of fingerprint entries stored in the node buffer of the root node exceeds a threshold level; and in response to a determination that the set of fingerprint entries stored in the node buffer of the root node exceeds a threshold level, distribute the set of fingerprint entries stored in the node buffer of the root node to node buffers of a plurality of child nodes.

18. The non-transitory machine-readable medium of claim 16, wherein each fingerprint entry includes a single fingerprint, wherein each fingerprint entry is routed along a node path through the fingerprint tracking structure based on the single fingerprint included in that fingerprint entry, and wherein each node path includes one node per level of the fingerprint tracking structure.

19. The non-transitory machine-readable medium of claim 18, including instructions executable by the processor to:

in response to a receipt of a tracking query for a first fingerprint, traverse the node path in the fingerprint tracking structure associated with the first fingerprint;

collect the tracking information from each fingerprint entry for the first fingerprint that is stored in the traversed path; and provide the collected tracking information as a response to the tracking query, wherein the collected tracking information comprises at least one of a quantity and a location of a data unit having the first fingerprint.

20. The non-transitory machine-readable medium of claim 16, including instructions executable by the processor to:

in response to a determination that two fingerprint entries for a same fingerprint are stored in a node buffer, combine the two fingerprint entries into a combined fingerprint entry, wherein the combined fingerprint entry includes all manifest identifiers included in the two fingerprint entries, and wherein the combined fingerprint entry also includes a quantity value equal to a sum of two quality values from the two fingerprint entries.

* * * * *